US011232616B2

(12) United States Patent
Bhat et al.

(10) Patent No.: US 11,232,616 B2
(45) Date of Patent: Jan. 25, 2022

(54) METHODS AND SYSTEMS FOR PERFORMING EDITING OPERATIONS ON MEDIA

(71) Applicant: Samsung Electronics Co., Ltd., Gyeonggi-do (KR)

(72) Inventors: Gururaj Bhat, Bangalore (IN); Adappa M Gourannavar, Bangalore (IN); Rahul Varna, Bangalore (IN); Pavan Sudheendra, Bangalore (IN); Mamata Pattanaik, Bangalore (IN); Nageswara Rao Pragada, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/559,101

(22) Filed: Sep. 3, 2019

(65) Prior Publication Data

US 2020/0074709 A1 Mar. 5, 2020

(30) Foreign Application Priority Data

Sep. 3, 2018 (IN) .............................. 201741043112

(51) Int. Cl.
*G06F 17/00* (2019.01)
*G06T 11/60* (2006.01)
(Continued)

(52) U.S. Cl.
CPC ................ *G06T 11/60* (2013.01); *G06N 3/08* (2013.01); *G06N 7/005* (2013.01); *G06F 3/04842* (2013.01)

(58) Field of Classification Search
CPC ...... G06F 3/04842; G06N 3/08; G06N 7/005; G06N 3/0454; G06T 11/60; G11B 27/031
See application file for complete search history.

(56) References Cited

U.S. PATENT DOCUMENTS 6,919,903 B2 * 7/2005 Freeman ............... G06T 11/001
345/582
8,849,853 B2 * 9/2014 Ptucha ................... G06T 11/60
(Continued)

FOREIGN PATENT DOCUMENTS

JP 2013-126059 6/2013
KR 10-1653812 9/2016
(Continued)

OTHER PUBLICATIONS

Yi-Hsuan, Tsai, et al, "Sky is Not the Limit: Semantic-Aware Sky Replacement", SigGraph '16 Technical Paper, Anaheim, CA, Jul. 24-28, 2016, pp. 1-11. (Year: 2016).*

(Continued)

*Primary Examiner* — Laurie A Ries
(74) *Attorney, Agent, or Firm* — The Farrell Law Firm, P.C.

(57) ABSTRACT

Methods and systems for performing editing operations on media are provided. A method includes receiving at least one reference media and at least one target media, identifying at least one dominant edit attribute of the at least one reference media, and performing a compatibility check to determine a compatibility of the at least one target media with the at least one dominant edit attribute of the at least one reference media. Based on results of the compatibility check, at least one compatible edit attribute is selected from the at least one dominant edit attribute, and the at least one compatible edit attribute is transferred from the at least one reference media to the at least one target media.

10 Claims, 32 Drawing Sheets

(51) Int. Cl.
   *G06N 7/00*   (2006.01)
   *G06N 3/08*   (2006.01)
   *G06F 3/0484* (2013.01)

(56) References Cited

U.S. PATENT DOCUMENTS

| | | | | |
|---|---|---|---|---|
| 9,285,971 | B2* | 3/2016 | Kokemohr | G06F 3/04817 |
| 9,569,100 | B2* | 2/2017 | Rav-Acha | G06T 11/60 |
| 10,733,587 | B2* | 8/2020 | Chandrasekaran | |
| | | | | G06K 9/00288 |
| 2004/0096096 | A1* | 5/2004 | Huber | H04N 13/128 |
| | | | | 382/152 |
| 2005/0227217 | A1* | 10/2005 | Wilson | G06K 9/20 |
| | | | | 434/337 |
| 2007/0098297 | A1* | 5/2007 | Fushiki | G06T 11/60 |
| | | | | 382/276 |
| 2007/0174079 | A1* | 7/2007 | Kraus | G06Q 10/10 |
| | | | | 705/3 |
| 2008/0240615 | A1* | 10/2008 | Yamazaki | G06T 11/60 |
| | | | | 382/287 |
| 2009/0067718 | A1* | 3/2009 | Shingai | G06T 11/60 |
| | | | | 382/173 |
| 2009/0125128 | A1* | 5/2009 | Eldridge | G05B 15/02 |
| | | | | 700/86 |
| 2011/0029562 | A1* | 2/2011 | Whitby | G06F 16/583 |
| | | | | 707/779 |
| 2011/0321096 | A1* | 12/2011 | Landow | H04N 21/4621 |
| | | | | 725/41 |
| 2012/0328169 | A1* | 12/2012 | Heeter | G06Q 30/0621 |
| | | | | 382/118 |
| 2013/0230110 | A1* | 9/2013 | Doron | H04N 19/46 |
| | | | | 375/240.26 |
| 2014/0068514 | A1* | 3/2014 | Ito | H04N 5/232945 |
| | | | | 715/810 |
| 2014/0080428 | A1* | 3/2014 | Rhoads | G06F 16/5838 |
| | | | | 455/88 |
| 2014/0104295 | A1* | 4/2014 | Sorkine-Hornung | G06T 11/60 |
| | | | | 345/589 |
| 2016/0042250 | A1* | 2/2016 | Cordova-Diba | G06K 9/00671 |
| | | | | 382/180 |
| 2016/0042251 | A1* | 2/2016 | Cordova-Diba | G06K 9/4604 |
| | | | | 382/180 |
| 2016/0283779 | A1* | 9/2016 | McPhie | G06K 9/6254 |
| 2016/0284381 | A1* | 9/2016 | Yang | G06F 16/783 |
| 2016/0350901 | A1* | 12/2016 | Shuster | H04N 5/225 |
| 2017/0024363 | A1* | 1/2017 | Tocchini | G06N 7/005 |
| 2017/0032554 | A1* | 2/2017 | O'Donovan | G06F 3/0488 |
| 2017/0221272 | A1* | 8/2017 | Li | G06T 7/248 |
| 2017/0374122 | A1* | 12/2017 | Zhang | H04N 21/4825 |
| 2018/0082407 | A1* | 3/2018 | Rymkowski | G06T 11/60 |
| 2019/0205694 | A1* | 7/2019 | Wang | G06K 9/00268 |

FOREIGN PATENT DOCUMENTS

| | | | | |
|---|---|---|---|---|
| WO | WO 2015/025999 | | 2/2015 | |
| WO | WO 2018/075927 | | 4/2018 | |
| WO | WO-2018075927 A1 * | | 4/2018 | G06K 9/6253 |

OTHER PUBLICATIONS

Yi-Hsuan Tsai et al., "Sky is Not the Limit: Semantic-Aware Sky Replacement", Technical Paper, Jul. 24-28, 2016, 11 pages.
International Search Report dated Dec. 4, 2019 issued in counterpart application No. PCT/KR2019/011061, 8 pages.
European Search Report dated Jul. 19, 2021 issued in counterpart application No. 19857989.8-1210, 8 pages.
Sean McCormack, "How to Match Your Image Processing Using Reference View in Lightroom", https://digital-photography-school.com/match-image-processing-reference-view-lightroom/, Aug. 19, 2017, 15 pages.
Indian Examination Report dated Dec. 31, 2020 issued in counterpart application No. 201741043112, 8 pages.

* cited by examiner

Reference media

Edited Media

Target media

Reference media

Edited image

Target media

METHODS AND SYSTEMS FOR PERFORMING EDITING OPERATIONS ON MEDIA

CROSS-REFERENCE TO RELATED APPLICATION(S)

This application is based on and claims priority under 35 U.S.C. § 119 to Indian Application No. 201741043112, filed on Sep. 3, 2018 in the Indian Patent Office, the disclosure of which is incorporated by reference herein in its entirety.

BACKGROUND

1. Field

The present disclosure relates generally to the field of processing media, and more particularly to performing editing operations on the media based on a selection of compatible edit attributes.

2. Description of Related Art

Currently, there are several media editing applications available to apply edit attributes (e.g., various effects/colors, artistic texture of a photo, fun stickers, etc.) on media which enhances the aesthetic of the media.

Existing media editing applications have their own set of edit attributes to choose from. Thus, when a user needs to apply similar edit attributes on a new media, the user is obliged to download the specific media editing application and follow specific steps for applying the similar edit attributes on the new media.

Also, if multiple edit attributes (e.g., effects, background blur, contrast, etc.) were applied on the media to generate a pleasing effect and the user wants to recreate the same effect on another media, then the user has to remember and perform the same steps on the desired media. This may result in the user having to perform complex editing operations. Further, the user may not able to create the similar effect on the desired media because of complex editing operations.

Further, when the user wants to recreate similar memories with existing contents received through social media, the user may not be aware of the media editing application which can create such effects on the desired media. Also, an amateur, or ordinary user, may not be technically aware of complex editing operations to be performed on the media.

In addition, the existing media editing applications enable the user to perform only limited operations, such as transferring a texture from one media to another and viewing a list of edit operations performed on the image.

SUMMARY

The present disclosure has been made to address the above-mentioned problems and disadvantages, and to provide at least the advantages described below.

In accordance with an aspect of the present disclosure, a method is provided that includes receiving, by a reception unit, at least one reference media and at least one target media, wherein the at least one reference media includes at least one edited portion; identifying, by a processing engine, at least one dominant edit attribute of the at least one reference media; performing, by the processing engine, a compatibility check to determine a compatibility of the at least one target media with the at least one dominant edit attribute of the at least one reference media; selecting, by the processing engine, at least one compatible edit attribute from the at least one dominant edit attribute based on a result of the compatibility check; and transferring, by an edit transfer engine, the at least one selected compatible edit attribute from the at least one reference media to the at least one target media.

In accordance with another aspect of the present disclosure, an electronic device is provided that includes a reception unit configured to receive at least one reference media and at least one target media, wherein the at least one reference media includes at least one edited portion. The electronic device further includes a processing engine configured to identify at least one dominant edit attribute of the at least one reference media, perform a compatibility check to determine a compatibility of the at least one target media with the at least one dominant edit attribute of the at least one reference media, and select at least one compatible edit attribute from the at least one dominant edit attribute based on a result of the compatibility check. In addition, the electronic device also includes an edit transfer engine configured to transfer the at least one selected compatible edit attribute from the at least one reference media to the at least one target media.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
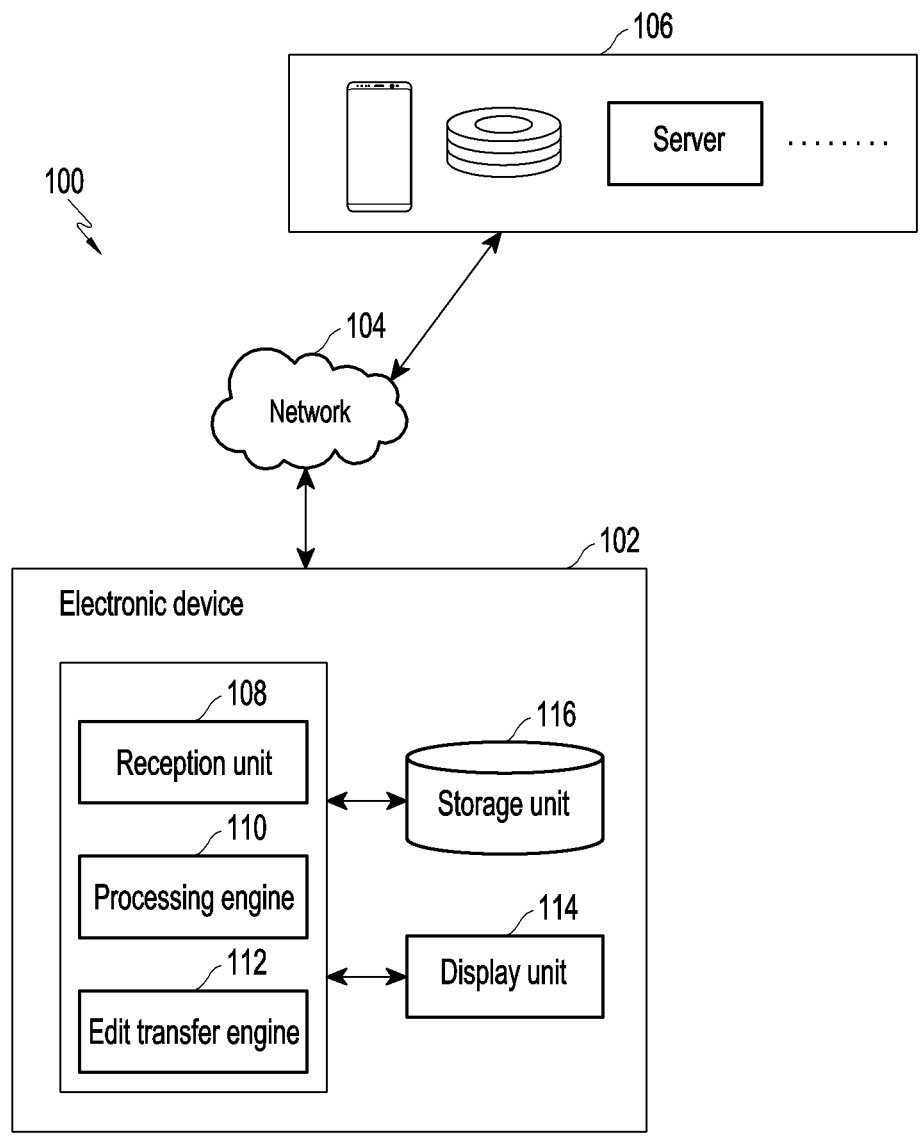
FIG. 1 is a system for performing editing operations on media, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

The embodiments herein disclose methods and systems for performing editing operations on media.

An object of the embodiments is for editing a target media by transferring a compatible edit attribute(s) from a reference media to the target media.

Another object of the embodiments is to for selecting the compatible edit attribute(s) of the reference media for editing the target media.

A method according to an embodiment includes receiving a reference media and a target media, wherein the reference media includes at least one media and at least one edited portion of media. Further, the method includes identifying one or more dominant edit attributes of the reference media. Additionally, the method includes performing a compatibility check to determine compatibility of the target media with the one or more dominant edit attributes of the one or more reference media. Based on result of the compatibility check, a compatible edit attribute(s) is selected from the one or more dominant attributes of the reference media. Further, the method includes transferring the compatible edit attribute from the reference media to the target media.

FIG. 1 is a system 100 for performing editing operations on media, according to an embodiment. The system includes an electronic device 102, a network 104 and an external source(s) 106. The electronic device 102 can be, but is not limited to, a mobile phone, a smartphone, tablet, a phablet, a personal digital assistant (PDA), a laptop, a computer, a wearable device, an Internet of things (IoT) device, a vehicle infotainment system, a medical device, a camera or any other device which supports editing of media. Examples of the media can be, but are not limited to, an image, a video, a graphics interchange format (GIFs), an animation and so on.

The electronic device 102 can communicate with the external source(s) 106 through the network 104 for receiving the media. Examples of the network can be, but are not limited to, the Internet, a wired network, and a wireless network (a Wi-Fi network, a cellular network, Wi-Fi hotspot, Bluetooth™, Zigbee™, and near-field communication (NFC)). The external source(s) 106 may comprise the media. Examples of the external source(s) 106 can be, but are not limited to, an electronic device, a camera, a server, a database, cloud storage, social media, and a website. The electronic device 102 includes a reception unit 108, a processing engine 110, an edit transfer engine 112, a display unit 114 and a storage unit 116.

The reception unit 108 can be configured to receive at least two media from a user for performing editing operations. The at least two media may be present in the electronic device 100 or may be obtained from one or more external sources 106. The at least two media includes a reference media (which is the media from which editing operation are copied from) and a target media (which is the media on which the editing operation is applied to). The reference media includes at least one of portion which has been edited (either previously or is being edited in real time).

The reception unit 108 can receive inputs from the user for initiating the editing operations on the target media. Examples of the inputs can be, but are not limited to, gestures (a gaze, an air gesture, a touch, a tap, a click, a press, a swipe, a hold, a drag and drop, and a drag), voice commands, gestures performed using a stylus pen (S-pen), device bend angle, and tap 2 devices (NFCBluetooth).

The processing engine 110 can be configured to process the reference media for identifying the edit classes/attributes of the reference media. The edit attributes can be, but are not limited to, texture attribute(s), effect attribute(s), template attribute(s), and selfies. Examples of the effect attribute can be pixel level changes such as, but not limited to, a broken effect, a change in temperature, a brightness, and a contrast. Examples of the template attribute can be, but are not limited to, static stickers, emojis, a fun shot, and collages. Examples of the selfies can be, but are not limited to, a face level beautification level, a slim chain, large eyes effects, and animated stickers.

The processing engine 110 may determine dominant edit attribute(s) from the edit attributes of the reference media. After determining the dominant edit attribute(s), the processing engine 110 may perform the compatibility check on the target media to determine a compatibility of the target media with the dominant edit attribute(s) of the reference media. Based on results of the compatibility check, the processing engine 110 may select compatible edit attribute(s) from the dominant edit attribute(s) based on a result of the compatibility check.

The edit transfer engine 112 can be configured to edit the target media by applying/transferring the compatible edit attribute(s) of the reference media on the target media. The display unit 114 can be configured to display the edited target media on a display screen of the electronic device 100.

The storage unit 116 can be configured to store reference media, the target media, the dominant and compatible edit attributes of the reference media, and the edited target media. The storage unit 116 can be at least one of a file server, a data server, a server, a cloud, and a memory. The memory may include one or more computer-readable storage media and non-volatile storage elements, such magnetic hard discs, optical discs, floppy discs, flash memories, forms of electrically programmable memories (EPROM) or electrically erasable and programmable (EEPROM) memories. In addition, the memory may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In some examples, the memory can be configured to store larger amounts of information than the memory. In certain examples, a non-transitory storage medium may store data that can, overtime, change (e.g., in random access memory (RAM) or cache).

FIG. 1 shows components of the system 100, but in other embodiments, the system 100 may include additional components, or fewer components. Further, the labels or names of the components are used only for illustrative purposes and do not limit the scope of the embodiments. One or more components can be combined together to perform the same or a substantially similar function in the system 100.

Figure 2A:
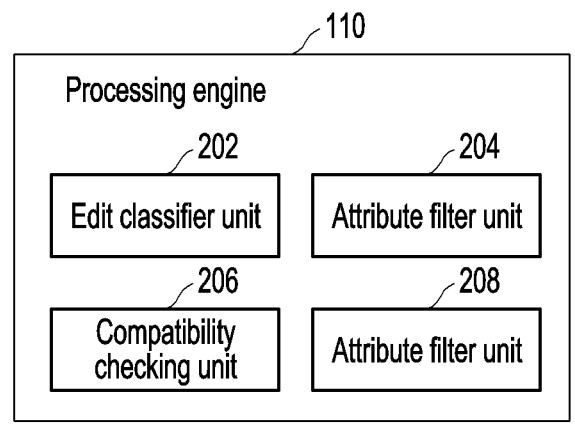
FIG. 2A is a block diagram illustrating various units of a processing engine for selecting compatible attributes of a reference media to edit a target media, according to an embodiment.

FIG. 2A is a block diagram illustrating various units of the processing engine 110 for selecting the compatible attribute(s) of the reference media to edit the target media, according to an embodiment. The processing engine 110 includes an edit classifier unit 202, an attribute filter unit 204, a compatibility checking unit 206 and an attribute selection unit 208.

The edit classifier unit 202 can be configured to determine the edit attributes of the reference media. The edit attributes can be classified into pre-defined attributes such as, but not limited to, the texture attribute, the template attribute, the effect attribute, and the selfies. The edit classifier unit 202 can also add all edits detected in the reference media, thereby extending attribute classification.

The edit classifier unit 202 may use feature extraction techniques, CNN or any other machine learning networks to identify the edit attributes of the reference media. Embodiments herein are further explained considering the CNN for identifying the edit attributes of the reference media, but it may be obvious to a person of ordinary skill in the art that any other form of feature extraction techniques can be used to identify the edit attributes. The CNN can be based on feature extraction networks such as, but not limited to, Visual Geometry Group (VGG16) neural network and Inception. Further, the CNN may include deep learning algorithms.

Upon receiving the reference media from the reception unit 202, the edit classifier unit 202 feeds the reference media to the CNN. The CNN can analyze portions of the reference media to identify the edit attributes of the reference media, as well as at least one of the portions of the reference media.

The edit classifier unit 202 can be further configured to calculate probability of the edit attributes of the reference media, as well as at least one of the portions of the reference media. The edit classifier unit 202 may use the CNN to calculate a probability of the edit attributes. The edit classifier unit 202 may use a softmax function of the CNN which can represent the probability distribution over N different possible outcomes (the probability for the edit attributes).

The attribute filter unit 204 can be configured to determine the dominant edit attribute(s) from the edit attributes of the reference media. The attribute filter unit 204 analyzes the probability of the edit attributes of the reference media to determine the dominant edit attribute(s) of the reference media. For example, the attribute filter unit 204 determines that the texture attribute and the template attribute can be the dominant edit attributes when the probability of the texture attribute and the template attribute are the same or higher than the effect attribute. In another example, the attribute filter unit 204 determines that the texture attribute can be the dominant edit attribute when the probability of the texture attribute is higher than that of the template attribute and the effect attribute. In yet another example, the attribute filter unit 204 determines that the texture attribute, the template attribute and the effect attribute can be the dominant edit attributes when the probability of the texture attribute, the template attribute and the effect attribute are same.

The compatibility checking unit 206 can be configured to perform the compatibility check on the target media. The compatibility checking unit 206 can receive the target media from the reception unit 108 and process at least one portion of the target media to identify source attribute(s) of the target media. The source attribute can be, but are not limited to, texture(s), template(s), effect(s), and selfies. The compatibility checking unit 206 can select at least one portion of the target media for processing based on meta-data associated with the target media. The compatibility checking unit 206 can select portions of the target media for processing upon receiving selection inputs from the reception unit 108. The selection inputs may be received from the user indicating the portions of the target image for processing.

The compatibility checking unit 206 compares the source attributes with the dominant edit attribute(s) of the reference media to determine a compatibility of at least one of the target media or one of the portions of the target media with the dominant edit attribute(s). Further, based on the compatibility of the target media, the compatibility checking unit 206 may assign a weight value to the dominant edit attribute(s). A higher weight value indicates that the target media is more compatible with the dominant edit attribute(s) of the reference media, A lower weight value indicates the target media is less compatible with the dominant edit attribute(s) of the reference media.

Consider a scenario, wherein the template attribute (i.e., face stickers) and the texture attribute are the dominant edit attributes of the reference media. The compatibility checking unit 206 compares the source attributes of the target media with the template attribute and the texture attribute of the reference media. Based on the comparison results, the compatibility checking unit 206 determines that the target media has a dominant texture and the target media does not contain the template attribute (i.e., a face for the face stickers). Thus, the compatibility checking unit 206 assigns a lower weight value to the template attribute and a higher weight value to the texture attribute.

The attribute selection unit 208 can be configured to select the compatible edit attribute(s) from the dominant edit attribute(s) of the reference media. The attribute selection unit 208 selects the compatible edit attribute(s) based on the weight value assigned to the dominant edit attribute(s). The compatible edit attribute can be the dominant edit attribute with which the at least one of the portions of the target media can be compatible. For example, the texture attribute and the template attribute may be determined as the dominant edit attributes of the reference media. Further, the texture attribute may have a higher weight value and the template attribute may have a lower weight value. Thus, the attribute selection unit 208 may select the texture attribute as the compatible edit attribute of the reference media.

Consider another example, wherein the effect attribute of the reference media is determined as the dominant edit attribute and the target media has many dark pixels. Thus, the effect attribute may be assigned with a lower weight value. In this scenario, the attribute selection unit 208 may not select the compatible edit attribute for editing the media as the target media because the effect attribute is determined as not compatible with the effect attribute. Thus, at least one relevant edit attribute can be identified to apply to the target media rather than performing a blind copy (i.e., a copy without a compatibility comparison) of the selected edit operations on the target media.

FIG. 2A shows components of the processing engine 110, but in other embodiments, the processing engine 110 may include additional components or fewer components. Further, the labels or names of the units are used only for illustrative purposes and do not limit the scope of the embodiments. One or more units can be combined together to perform the same or a substantially similar function in the processing engine 110.

Figure 2B:
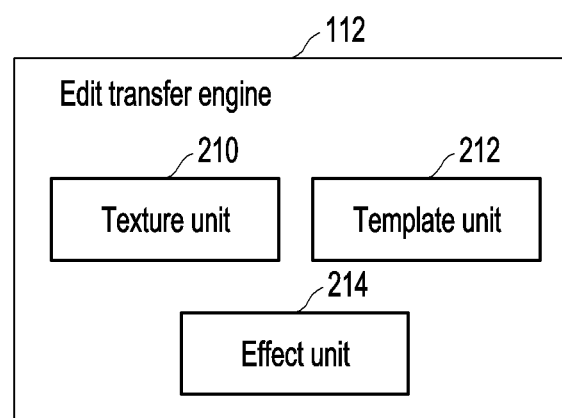
FIG. 2B is a block diagram illustrating various units of an edit transfer engine for applying compatible edit attributes on a target media, according to an embodiment.

FIG. 2B is a block diagram illustrating various units of the edit transfer engine 112 for applying the compatible edit attributes on the target media, according to an embodiment. The edit transfer engine 112 transfers the compatible edit attribute(s) from the reference media to at least one of compatible portions of the target media and compatible target media. The edit transfer engine 112 can receive the inputs (i.e., scrabble or irregular marking) from the user specifying the portions of the target media for which the compatible edit attributes can be applied. For example, the edit transfer engine 112 can apply at least one of the texture attribute, the template attribute and the effect attribute on the at least one of the portions of the target media in response to determining that at least one of the texture attribute, the template attribute and the effect attribute can be the compatible edit attribute.

The edit transfer engine 112 may transfer the compatible edit attribute(s) of the reference media present on a first electronic device to the target media present on the second electronic device using suitable communication techniques (such as NFC, Bluetooth, Wi-Fi, Bluetooth™ low energy (BLE)).

The edit transfer engine 112 includes a texture unit 210, a template unit 212 and an effect unit 214. The texture unit 210 can be configured to apply the texture attribute of the reference media on the at least one of the portions of the target media and the entire target media. The texture unit 210 uses a combination of an auto encoder neural network, a texture style aligner and an auto decoder for transferring the texture attribute of the reference media to the at least one of the portions of the target media and the entire target media.

The template unit 212 can be configured to apply the template attribute on the at least one of the portions of the target media and the entire target media. The template unit 212 extracts mask(s) (e.g., faces, emojis, stickers, etc.) associated with the template attribute(s) of the reference media using image segmentation methods. The template unit 212 matches the template attribute(s) with template(s) stored in at least one of a local template database and a cloud template database. Based on a successful match, the template unit 212 transfers the template attribute to the at least one of the portions of the target media and the entire target media.

The effect unit 214 can be configured to apply the effect attribute on the at least one of the portions of the target media and the entire target media. The effect unit 214 may emulate and copy pixel level color changes from the reference media to the target media using a color transformation algorithm and an image filter effect algorithm.

FIG. 2B shows components of the edit transfer engine 112, but it is to be understood that the edit transfer engine 112 may include additional components or fewer components. Further, the labels or names of the components are used only for illustrative purposes and do not limit the scope of the embodiments. One or more components can be combined together to perform the same or a substantially similar function in the edit transfer engine 112.

Figure 3:
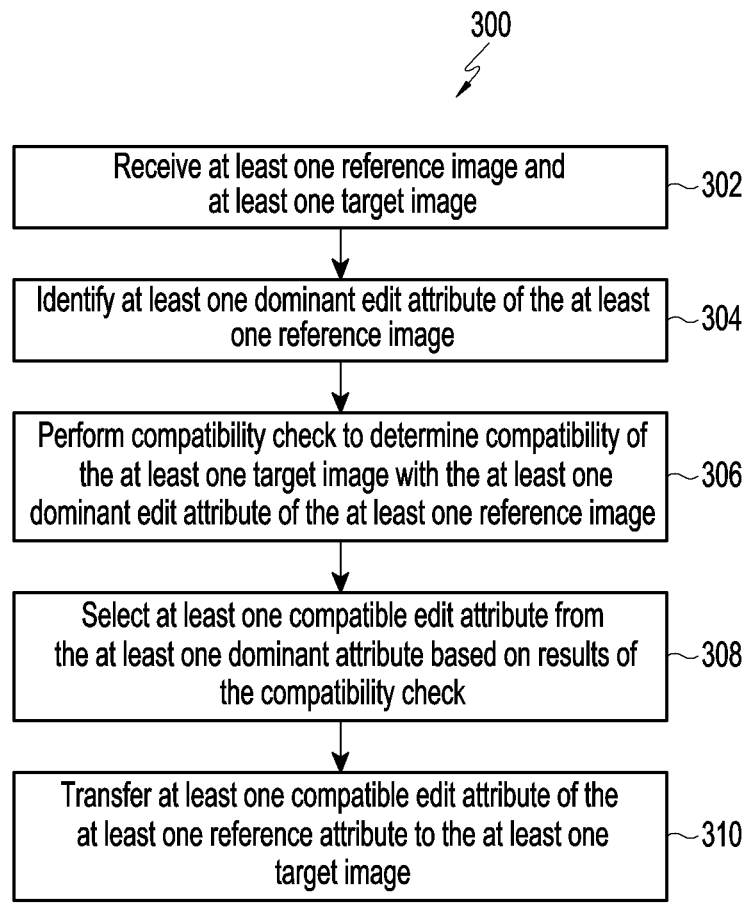
FIG. 3 is a flowchart illustrating a method for performing editing operations on media, according to an embodiment.

FIG. 3 is a flowchart 300 illustrating a method for performing editing operations on media, according to an embodiment.

At step 302, the method includes receiving, by the reception unit 108 of the electronic device 102, the reference media and the target media. The reference media can include at least one of the portions of the media and the media which are previously edited. At step 304, the method includes identifying, by the processing engine 110 of the electronic device 102, the dominant edit attribute(s) of the reference media.

At step 306, the method includes performing, by the processing engine 110, the compatibility check to determine a compatibility of the target media with the dominant edit attribute(s). At step 308, the method includes selecting, by the processing engine 110, one or more compatible edit attribute(s) from the dominant edit attribute(s) based on a result of the compatibility check. The processing engine 110 can select the compatible edit attribute(s) based on the weight value assigned to the dominant edit attribute(s). The weight value can be assigned to the dominant edit attribute(s) based on the result of the compatibility check.

At step 310, the method includes transferring, by the edit transfer engine 112, the compatible edit attribute(s) from the reference media to the target media. The edit transfer engine 112 can transfer the compatible edit attribute(s) to specific portions of the target media. The specific portions can be the portions of the target image which are compatible with the dominant edit attribute(s) of the reference media.

The various actions, acts, blocks, or steps in the method and flowchart 300 may be performed in the order presented, in a different order or simultaneously. Further, some of the actions, acts, blocks, or steps may be omitted, added, modified, or skipped without departing from the scope of the disclosure.

Figure 4A:
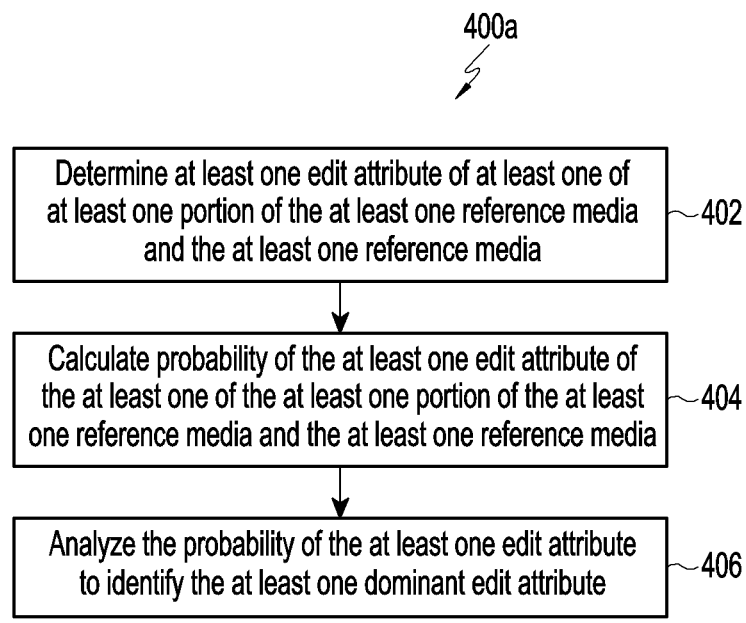
FIG. 4A is a flowchart illustrating a method for selecting dominant edit attributes of a reference media, according to an embodiment.

FIG. 4A is a flowchart 400a illustrating a method for selecting the dominant edit attribute(s) of the reference media, according to an embodiment.

At step 402, the method includes determining, by the processing engine 110, the edit attributes of the at least one of the reference media or at least one of the portions of the reference media. At step 404, the method includes calculating, by the processing engine 110, a probability of the edit attributes of the at least one of the reference media or at least one of the portions of the reference media. The processing engine 110 uses the CNN to determine the edit attributes and the probability of the edit attributes.

At step 406, the method includes analyzing, by the processing engine 110, the probability of the edit attributes to determine the dominant edit attribute(s) of the reference media. The processing engine 110 selects the edit attributes having the higher probability as the dominant edit attribute(s) of the reference media.

The various actions, acts, blocks, or steps in the method and the flowchart 400a may be performed in the order presented, in a different order or simultaneously. Further, some of the actions, acts, blocks, or steps may be omitted, added, modified, or skipped without departing from the scope of the disclosure.

Figure 4B:
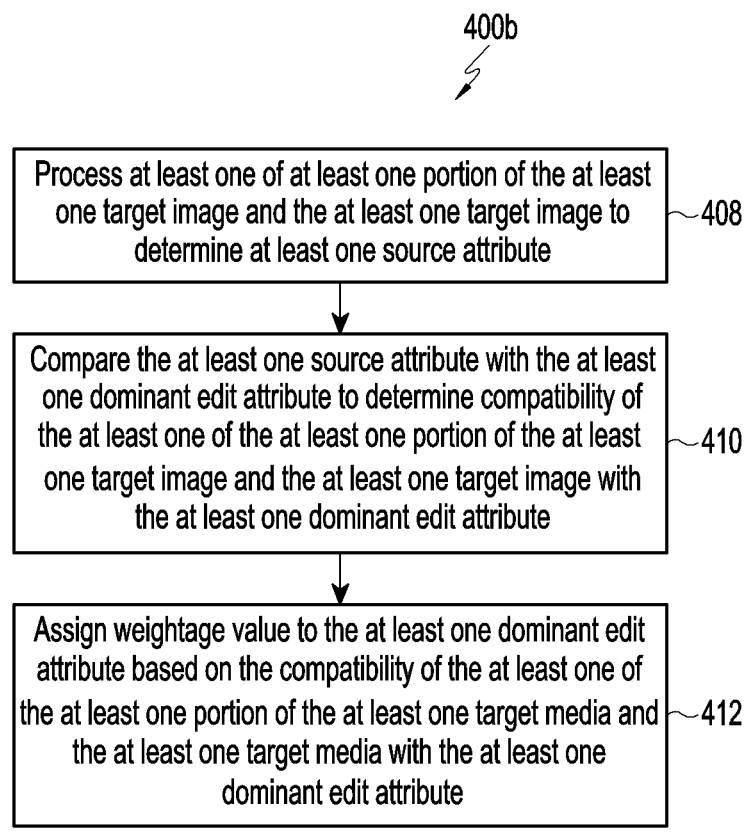
FIG. 4B is a flowchart illustrating a method for performing a compatibility check on a target media, according to embodiments an embodiment.

FIG. 4B is a flowchart 400b illustrating a method for performing a compatibility check on the target media, according to an embodiment.

At step 408, the method includes processing, by the processing engine 110, at least one portion of the target media to determine the source attribute(s). At step 410, the method includes comparing, by the processing engine 110, the source attribute(s) with the dominant edit attribute(s) of the target media to determine the compatibility of the at least one of the portions of the target media with the dominant edit attribute(s).

At step 412, the method includes assigning, by the processing engine 110, a weight value to the dominant edit attribute(s) based on the compatibility of the at least one of the portions of the target media and the target media with the dominant edit attribute(s). The processing engine 110 assigns a higher weight value to the dominant edit attribute(s) when the at least one of the portions of the target media are compatible with the dominant edit attribute. The processing engine 110 assigns a lower weight value to the dominant edit attribute(s) when the at least one of the portions of the target media are not compatible with the dominant edit attribute(s).

The various actions, acts, blocks, or steps in the method and the flowchart 400b may be performed in the order presented, in a different order or simultaneously. Further, some of the actions, acts, blocks, or steps may be omitted, added, modified, or skipped without departing from the scope of the disclosure.

Figure 5:
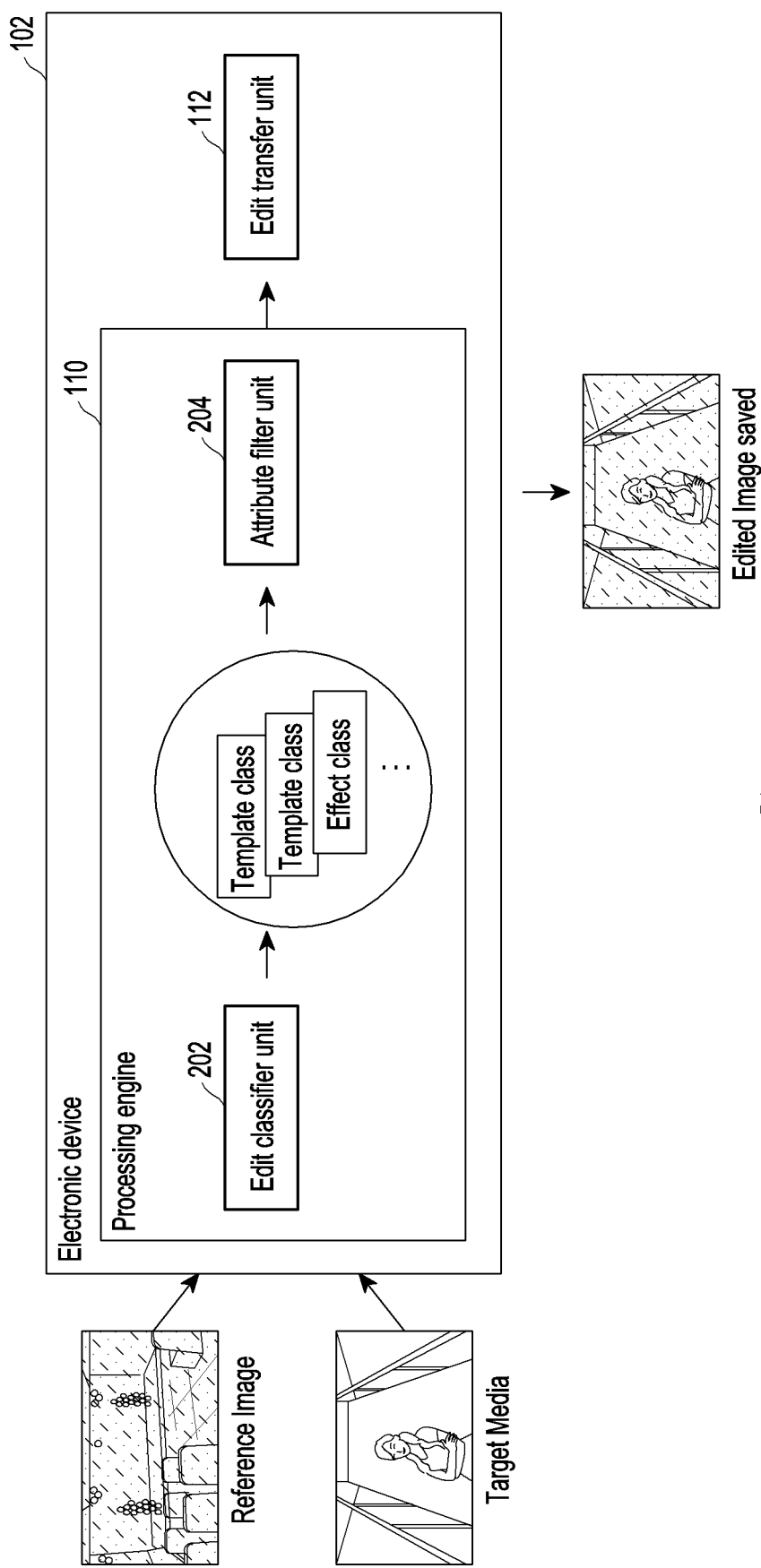
FIG. 5 is a block diagram illustrating various modules of an electronic device for performing editing operations on media, according to an embodiment.

FIG. 5 is a block diagram illustrating various modules of the electronic device 102 for performing editing operations on the target media, according to an embodiment. Embodiments of the present disclosure allow the electronic device 102 to edit the media by intelligently selecting the compatible edit attributes of the reference media. The electronic device 102 may include the processing engine 110 to select the compatible edit attributes of the reference media and the edit transfer engine 112 to transfer the compatible edit attribute(s) of the reference media to the target media.

As illustrated in FIG. 5, the edit classifier unit 202 of the processing engine 110 receives the reference media/pre-edited media and the target media. The edit classifier unit 202 determines the edit attributes (i.e., the texture attribute, the template attribute and the effect attribute) present in at least one of the reference media and the portions of the reference media. Further, the edit classifier unit 202 calculates the probability of the edit attributes.

The attribute filter unit 204 of the processing engine 110 may determine the dominant edit attribute(s) from the edit attributes of the reference media based on the calculated probability of the edit attributes. The attribute filter unit 204 further may perform a compatibility check on the target media to determine the compatibility of the target media with the dominant edit attribute(s). Based on results of the compatibility check, the attribute filter unit 204 may determine the compatible edit attribute(s) from the dominant edit attribute(s).

The edit transfer engine 112 may transfer the compatible edit attribute(s) from the reference media to the target media. Thus, only relevant edit attributes may be applied to the target media.

Figure 6:
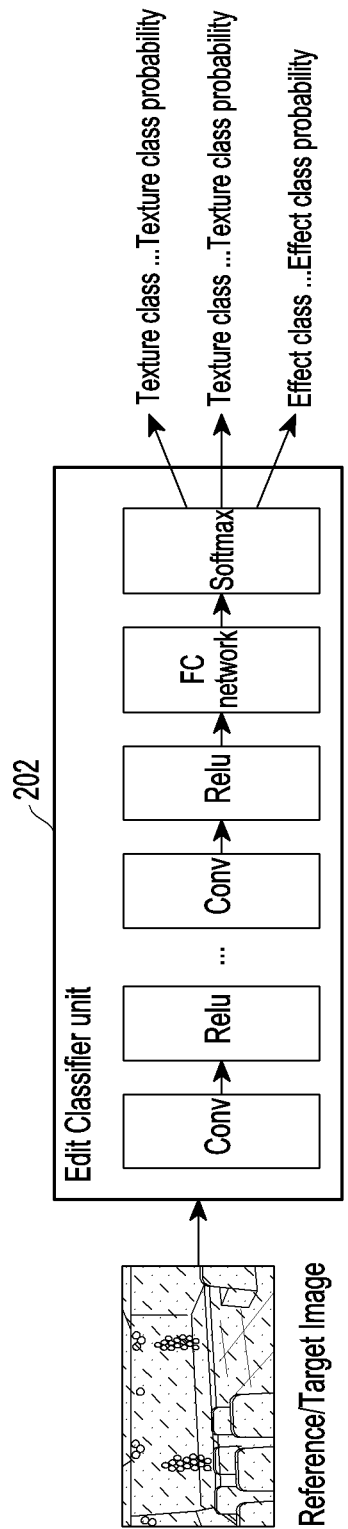
FIG. 6 illustrates an edit classifier unit including a convolutional neural network (CNN) for determining edit attributes of the reference media, according to an embodiment.

FIG. 6 illustrates the edit classifier unit 202 including the CNN for determining the edit attributes of the reference media, according to an embodiment. The edit classifier unit 202 may use the CNN for determining the edit attributes of the reference media (or the target media). The edit classifier unit 202 provides the reference media to the CNN. The CNN may include a feature learning map and a classification part. The CNN may learn the edit attributes/features of the reference media using a series convolutional layer (Cony) and activation map layer (Relu). Further, the CNN may classify the edit attributes into pre-defined attributes such as, the texture attribute, the template attribute, and the effect attribute using a fully-connected (FC) layer and a softmax classifier. In addition, the CNN may calculate the probability of the edit attributes of the reference media.

Figure 7:
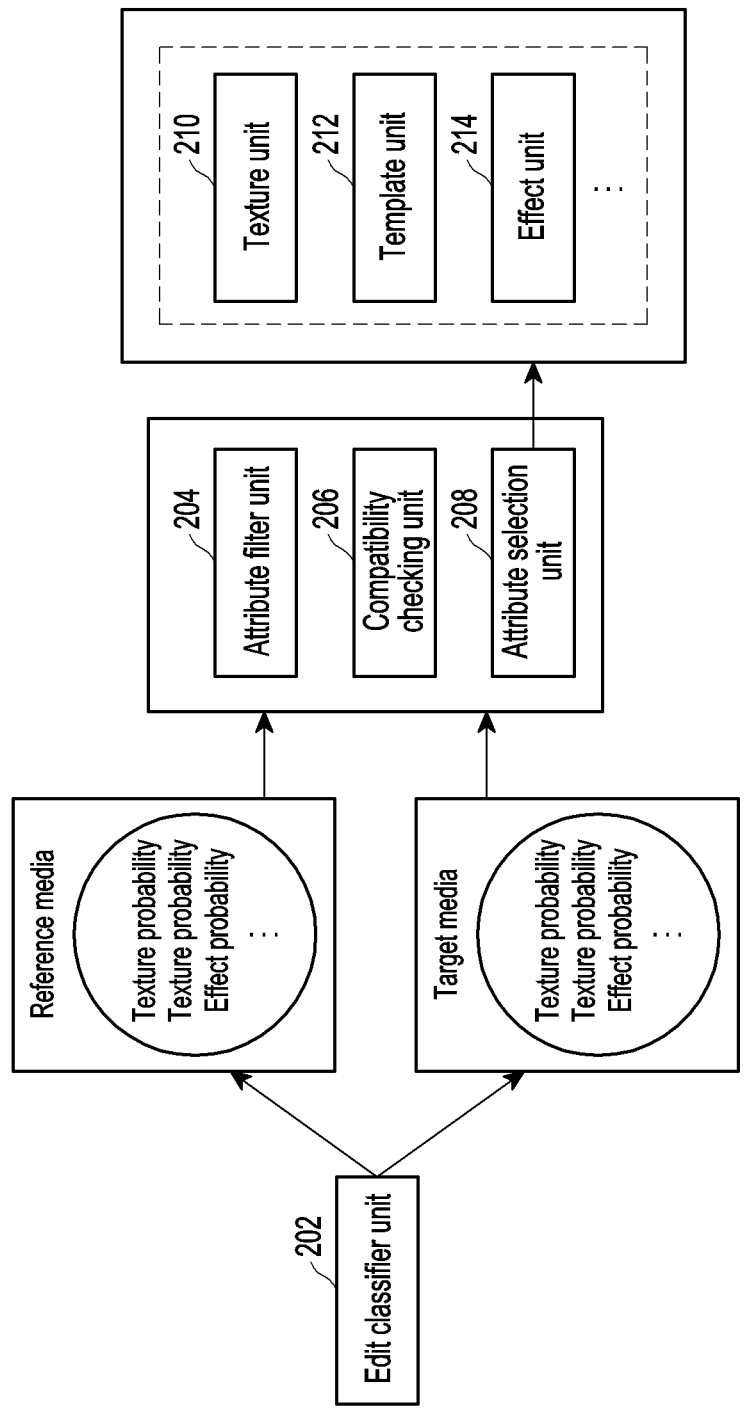
FIG. 7 illustrates a processing engine and an edit transfer engine for selecting and applying compatible edit attributes of a reference media on target media, according to an embodiment.

FIG. 7 illustrates the processing engine 110 and the edit transfer engine 112 for selecting and applying the compatible edit attributes of the reference media on the target media, according to an embodiment. The edit classifier unit 202 of the processing engine 110 provides information about the probability of the edit attributes of the reference media and the target media to the attribute filter unit 204.

Upon receiving information about the probability of the edit attributes, the attribute filter unit 204 may determine the dominant edit attribute(s). The dominant edit attribute(s) can be at least one of the texture attribute, the template attribute and the effect attribute. After determining the dominant edit attributes, the compatibility checking unit 206 may check the compatibility of the target media with respect to the dominant edit attribute(s). Based on the results of the compatibility check, the attribute selection unit 208 may select the compatible edit attribute(s) from the dominant edit attributes. The compatible edit attributes can be at least one of the texture attribute, the template attribute and the effect attribute.

For example, if the compatible edit attribute is determined as the texture attribute, then the texture unit 210 applies the texture attribute on the target media. If the compatible edit attribute is determined as the template attribute, then the template unit 212 applies the template attribute on the target media. Similarly, if the compatible attribute is determined as the effect attribute, then the effect unit 214 can apply the effect attribute on the target media.

Figure 8A:
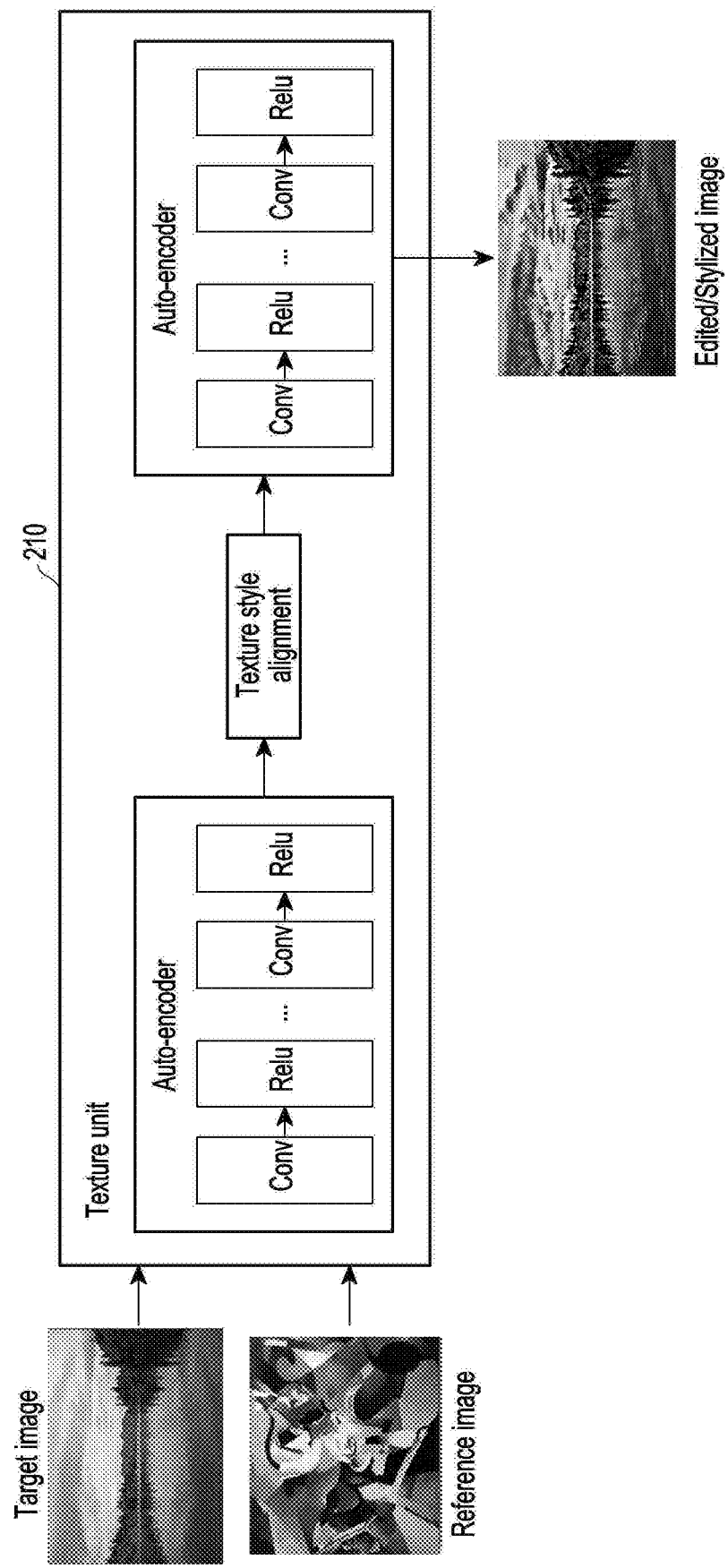
FIG. 8A illustrates a texture unit for transferring a texture attribute from a reference media to a target media, according to an embodiment.

FIG. 8A illustrates the texture unit 210 for transferring a texture attribute from the reference media to the target media, according to an embodiment. The texture unit 210 may use the auto-encoder neural network, the texture style aligner and the auto-decoder to apply the texture attribute of the reference media on the target media. The auto-encoder neural network and the auto-decoder may include a Cony and a Relu.

Figure 8B:
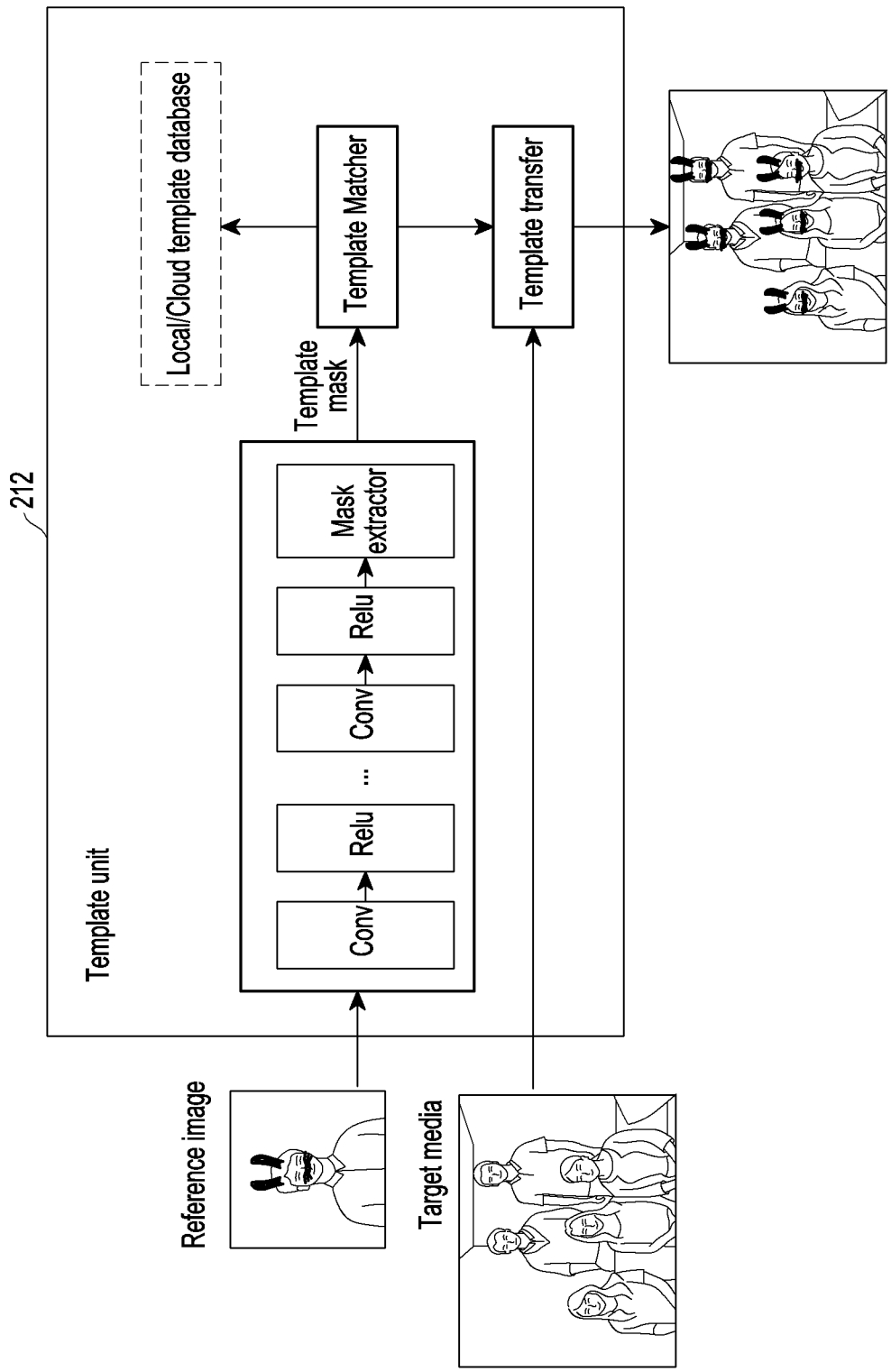
FIG. 8B illustrates a template unit for transferring a template attribute from a reference media to a target media, according to an embodiment.

FIG. 8B illustrates the template unit 212 for transferring the template attribute from the reference media to the target media, according to an embodiment. The template unit 212 may use a Cony and a Relu to extract a template mask(s) of the reference media. Further, the template unit 212 may match the extracted template mask(s) with the template database using pattern matching method. Based on a successful matching, the template unit 212 may apply the extracted template mask(s) to the target media.

Figure 8C:
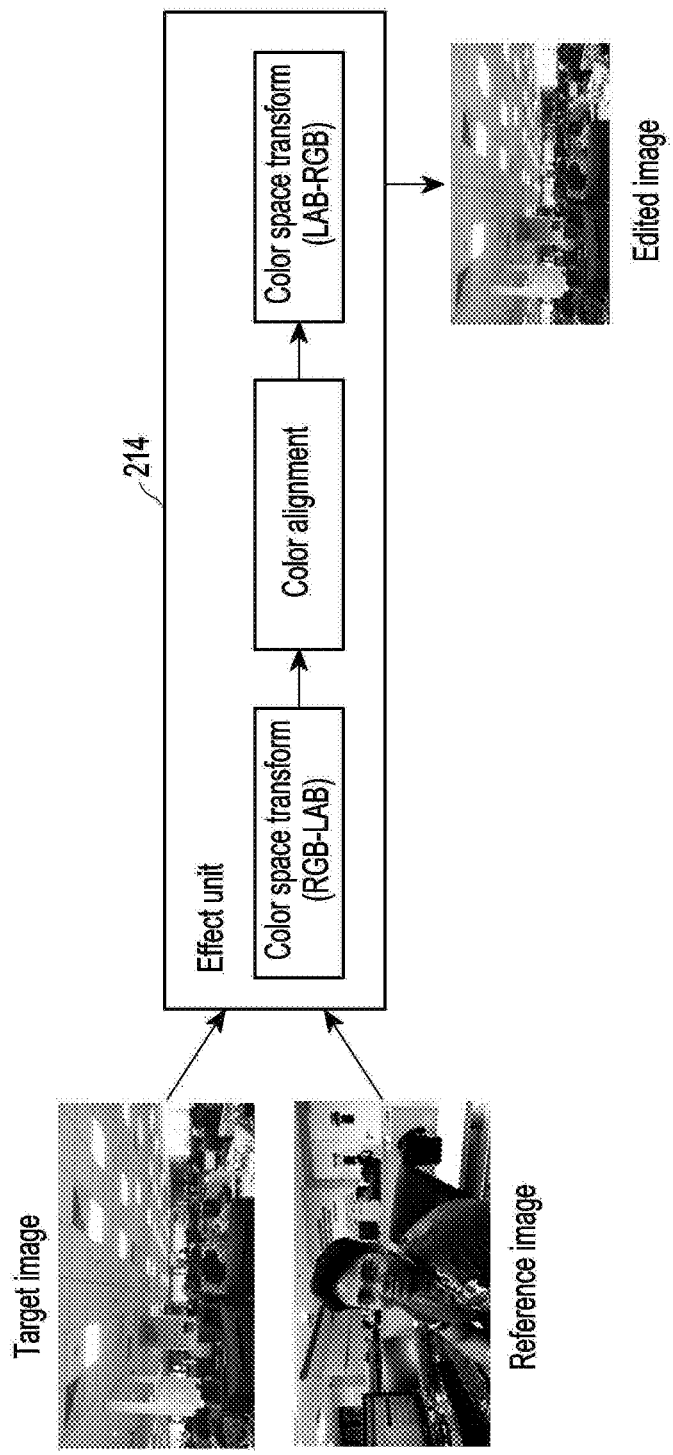
FIG. 8C illustrates an effect unit for transferring an effect attribute from a reference media to a target media, according to an embodiment.

FIG. 8C illustrates the effect unit 214 for transferring the effect attribute from the reference media to the target media, according to an embodiment. The effect unit 214 may perform actions like emulating and copying pixel level color changes from the reference media to the target media using a color transformation algorithm. The effect unit can also apply an image filter effects algorithm to apply the effect attribute on the target media.

Figure 9A:
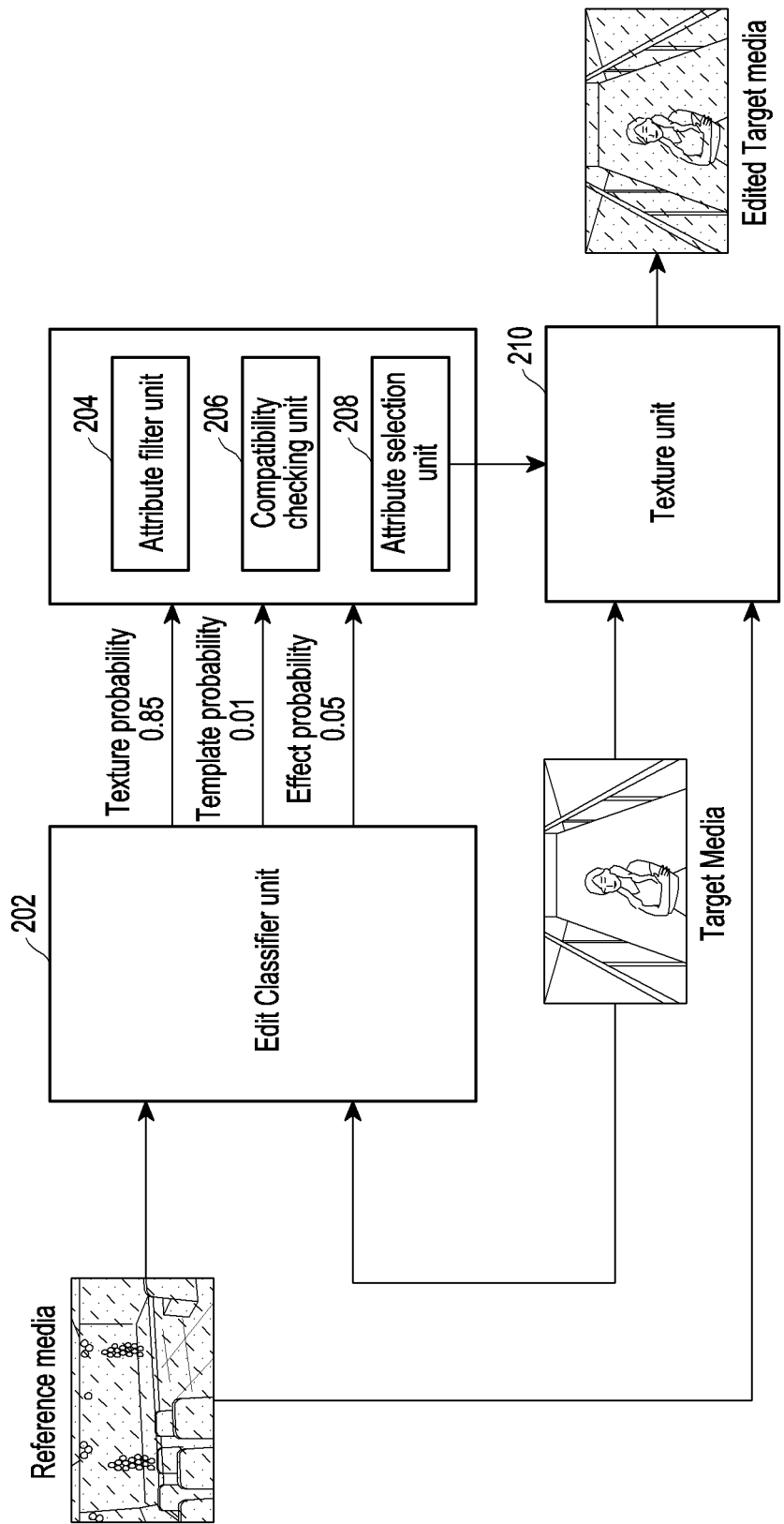
FIG. 9A is a diagram illustrating selection of one or more compatible edit attribute(s) of a reference media for editing a target media, according to an embodiment.
Figure 9B:
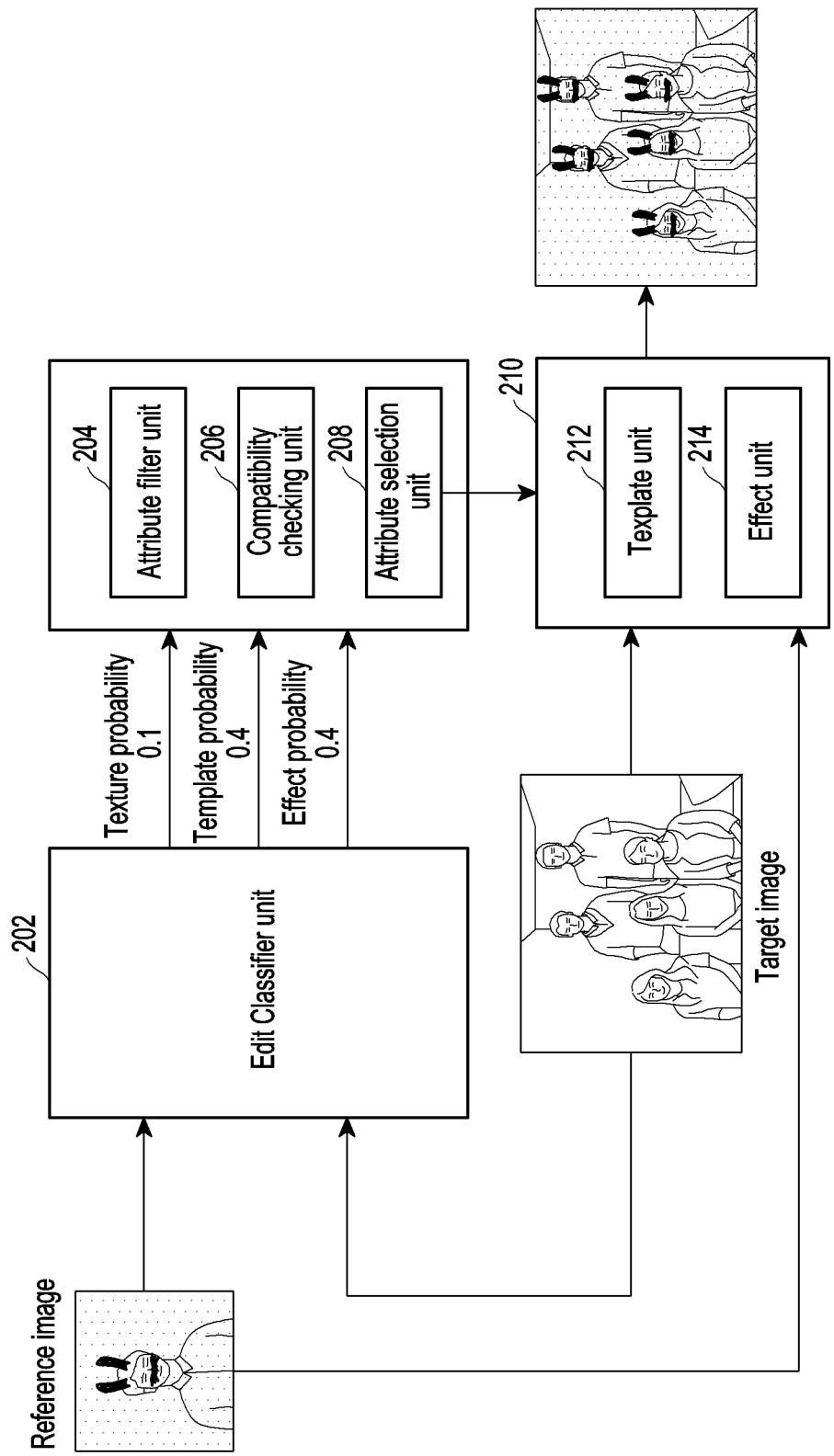
FIG. 9B is a diagram illustrating selection of one or more compatible edit attribute(s) of a reference media for editing a target media, according to an embodiment.
Figure 9C:
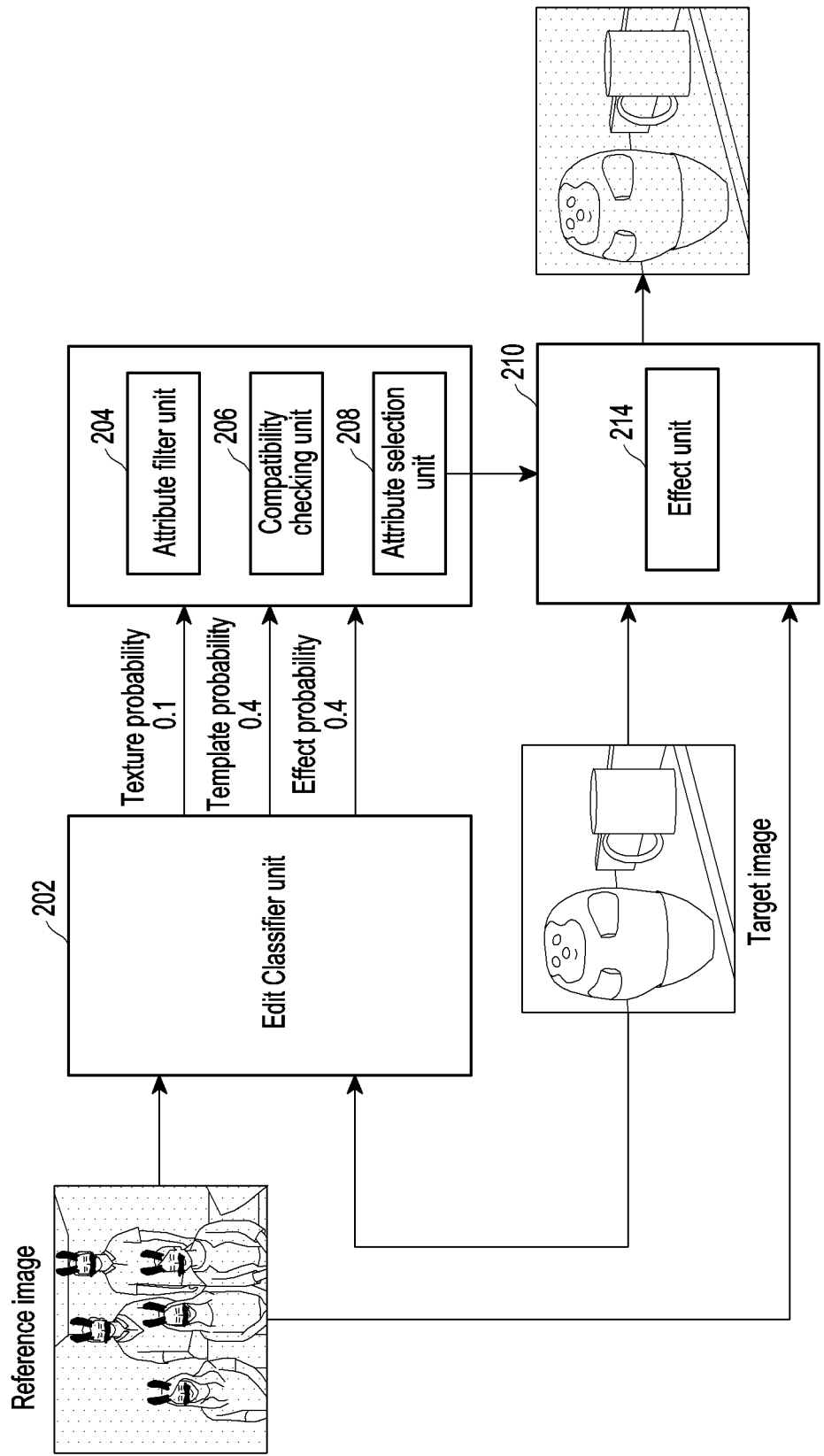
FIG. 9C is a diagram illustrating selection of one or more compatible edit attribute(s) of a reference media for editing a target media, according to an embodiment.

FIGS. 9A, 9B and 9C are diagrams illustrating selections of the compatible edit attribute(s) of the reference media for editing the target media, according to various embodiments.

FIG. 9A is a diagram illustrating a selection of the texture attribute as the compatible edit attribute for editing the target media. As illustrated in FIG. 9A, the edit classifier unit 202 of the processing engine 110 receives the reference media and identifies the edit attributes of the reference media. The edit attributes can be the texture attribute, the template attribute and the effect attribute. Further, the edit classifier unit 202 calculates the probability of the edit attributes of the reference media. For example, the probability of the texture attribute may be 0.85, the probability of the template attribute may be 0.01 and the probability of the effect attribute may be 0.05. Because the texture attribute has higher probability than the template attribute and the effect attribute, the attribute filter unit 204 of the processing engine 110 selects the texture attribute as the dominant edit attribute.

Further, the compatibility checking unit 206 of the processing engine 110 may check the target media for compatibility with the texture attribute. The compatibility checking unit 206 may determine that the target media is compatible with the texture attribute unit. Thus, the compatibility checking unit 206 may assign a higher weight value to the texture attribute.

The attribute selection unit 208 of the processing engine 110 may select the texture attribute as the compatible edit attribute because the texture attribute has a higher weight value. Thus, the texture unit 210 of the edit transfer engine 112 may transfer the texture attribute from the reference media to the target media.

FIG. 9B is a diagram illustrating selection of the effect attribute and the template attribute as the compatible edit attributes for editing the target media. As illustrated in FIG. 9B, the edit classifier unit 202 of the processing engine 110 receives the reference media and identifies the edit attributes of the reference media. The edit attributes can be the texture attribute, the template attribute and the effect attribute. Further, the edit classifier unit 202 calculates the probability of the edit attributes of the reference media. For example, the probability of the texture attribute may be 0.1, the probability of the template attribute may be 0.4 and the probability of the effect attribute may be 0.4. The attribute filter unit 204 selects the template attribute and the effect attribute as the dominant edit attributes since the probability of the template attribute and the effect attribute are same as or higher than the texture attribute.

Further, the compatibility checking unit 206 of the processing engine 110 may check the target media for compatibility with the template attribute and the effect attribute. The compatibility checking unit 206 may determine that the target media is compatible with the template attribute and the effect attribute. Thus, the compatibility checking unit 206 may assign a higher weight value to the template attribute and the effect attribute.

The attribute selection unit 208 of the processing engine 110 may select the template attribute and the effect attribute as the compatible edit attributes based on the weight value. Thus, the template unit 212 and the effect unit 214 may transfer the template attribute and the effect attribute from the reference media to the target media respectively.

FIG. 9C is a diagram illustrating selection of the effect attribute as the compatible edit attribute for editing the target media. As illustrated in FIG. 9C, the edit classifier unit 202 receives the reference media and identifies the edit attributes of the reference media. The edit attributes can be the texture attribute, the template attribute and the effect attribute. Further, the edit classifier unit 202 calculates the probability of the edit attributes of the reference media. For example, the probability of the texture attribute may be 0.1, the probability of the template attribute may be 0.4 and the probability of the effect attribute may be 0.4. The attribute filter unit 204 selects the template attribute and the effect attribute as the dominant edit attributes since the probability of the template attribute and the effect attribute are the same as or higher than the texture attribute.

Further, the compatibility checking unit 206 may check the target media for compatibility with the template attribute and the effect attribute. The compatibility checking unit 206 may determine that the target media is compatible with the effect attribute and not compatible with the template attribute. Thus, the compatibility checking unit 206 may assign a higher weight value to the effect attribute and a lower weight value to the template attribute.

The attribute selection unit 208 may select the effect attribute as the compatible edit attribute based on the higher weight value. Thus, the effect unit 214 may transfer the effect attribute from the reference media to the target media.

Figure 10:
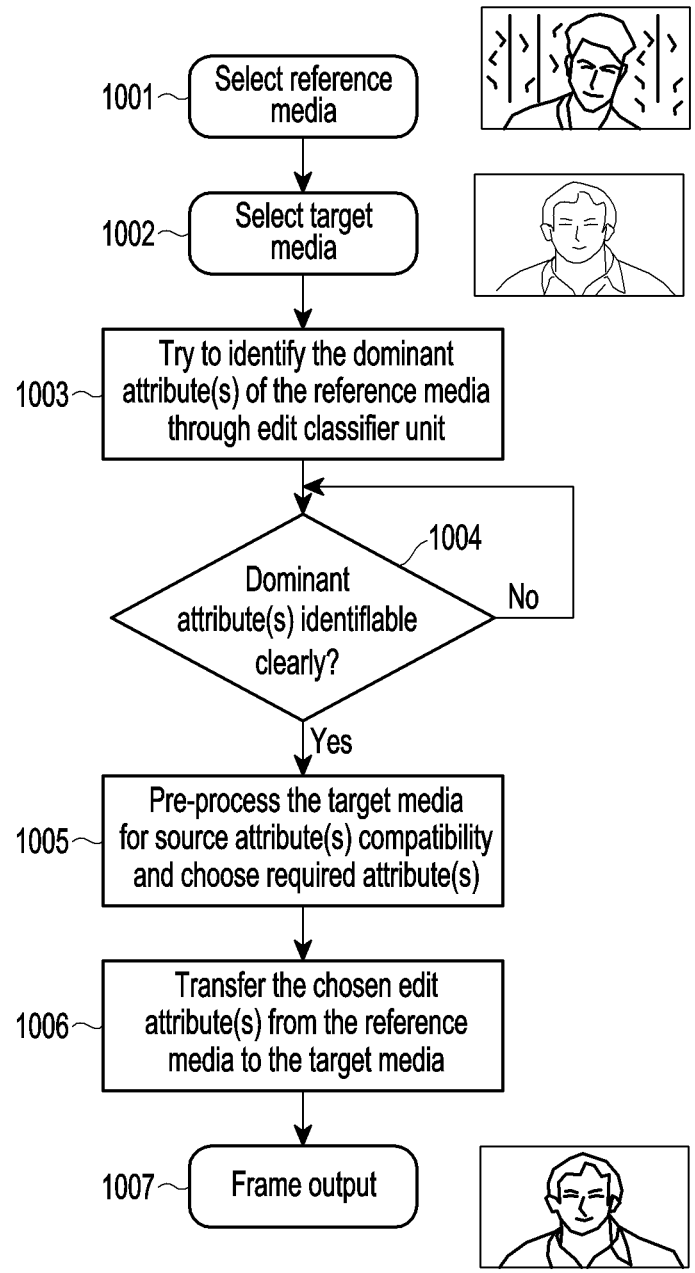
FIG. 10 is a flowchart illustrating transferring of compatible edit attributes from a reference media to a target media, according to an embodiment.

FIG. 10 is a flowchart illustrating transferring of the compatible edit attributes from the reference media to the target media, according to an embodiment. As illustrated in FIG. 10, at step 1001 the processing engine 110 selects the reference media. At step 1002, the processing engine 110 selects the target media. At step 1003, the processing engine 110 identifies the dominant edit attributes of the reference media. At step 1004, the processing engine 110 checks whether the dominant edit attributes are clearly identifiable or not. In response to determining that the dominant edit attributes are not clearly identifiable, the processing engine 110 stops performing the editing operations on the target media and does not proceed to step 1005.

In response to determining that the dominant edit attributes are clearly identifiable, the processing engine 110 processes the target media and identifies the source attribute(s) at step 1005. The processing engine 110 may additionally compare the source attribute(s) with the dominant edit attribute(s); assign the weight value to the dominant edit attribute(s) based on the compatibility of the target media with the dominant edit attribute(s); and select the dominant edit attribute(s) as compatible edit attribute(s) based on the weight value assigned to the dominant edit attribute(s).

After selecting the compatible edit attribute(s), in step 1006, the edit transfer engine 112 transforms the compatible edit attribute from the reference media to the target media. In step 1007, the edited target media is displayed on the display screen of the electronic device as a frame output.

Figure 11A:
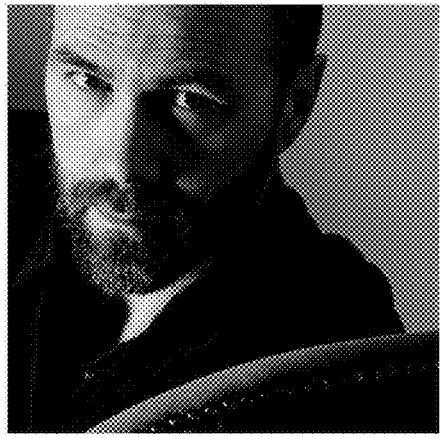
FIG. 11A is a diagram illustrating selection of at least one dominant edit attribute(s) of a reference media, according to an embodiment.
Figure 11A:
Figure 11A:
Figure 11A:
Figure 11B:
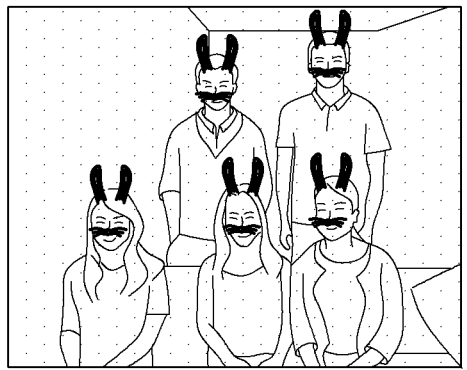
FIG. 11B is a diagram illustrating selection of at least one dominant edit attribute(s) of a reference media, according to an embodiment.
Figure 11B:
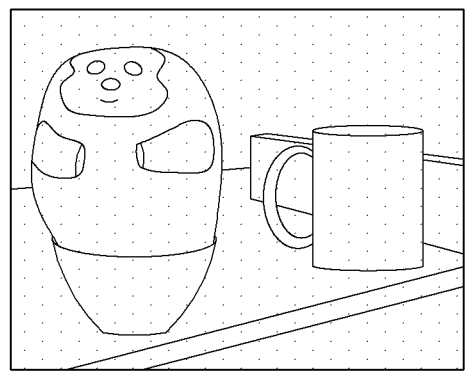
Figure 11B:
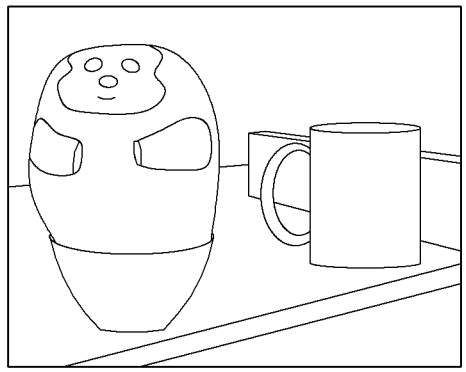

FIGS. 11A and 11B are diagrams illustrating selection of the dominant edit attribute(s) of the reference media, according to various embodiments. The processing engine 110 may identify the dominant edit attribute(s) of the reference media using the CNN. For example, the processing engine 110 identifies the effect attribute (color effects) as the dominant edit attribute in the reference media as illustrated in FIG. 11A. Thus, only color information can be transformed to the target media.

In another example, the processing engine 110 identifies the effect attribute (i.e., color effects) and the template attribute as the dominant edit attributes in the reference media as illustrated in FIG. 11B. Thus, the effect attribute and the template attribute can be applied on the target media.

Figure 12A:
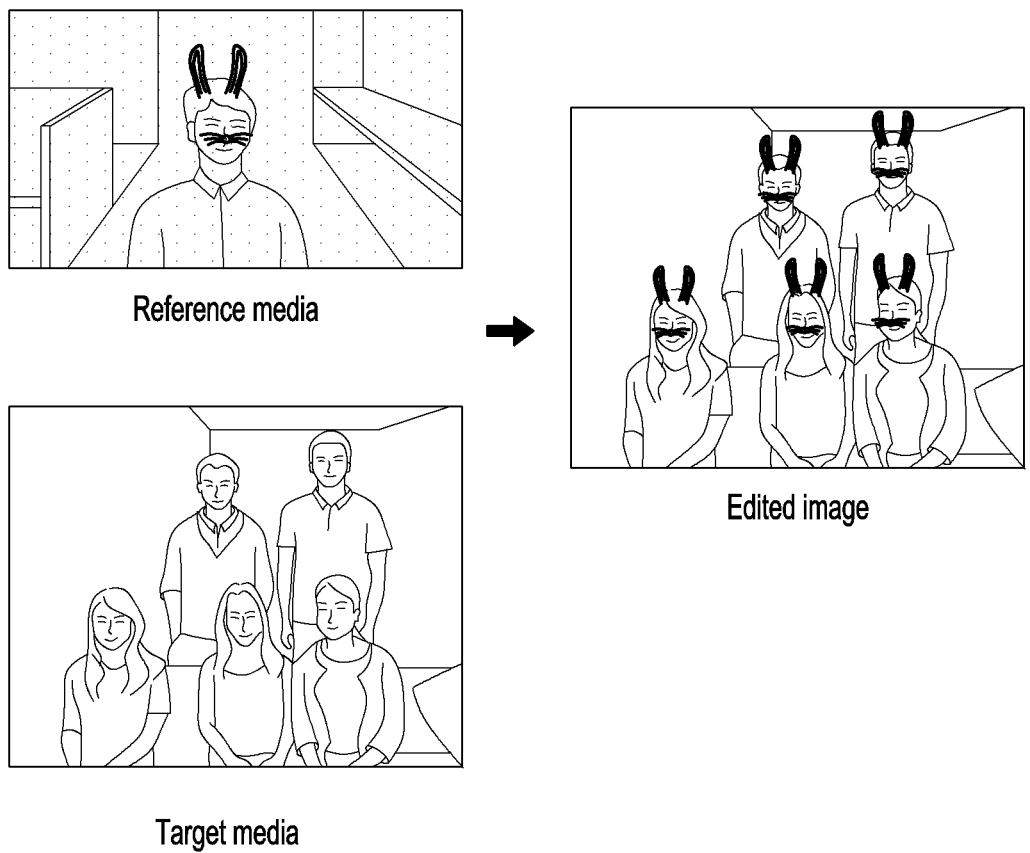
FIG. 12A is a diagram illustrating a compatibility check process performed on a target media, according to an embodiment.
Figure 12B:
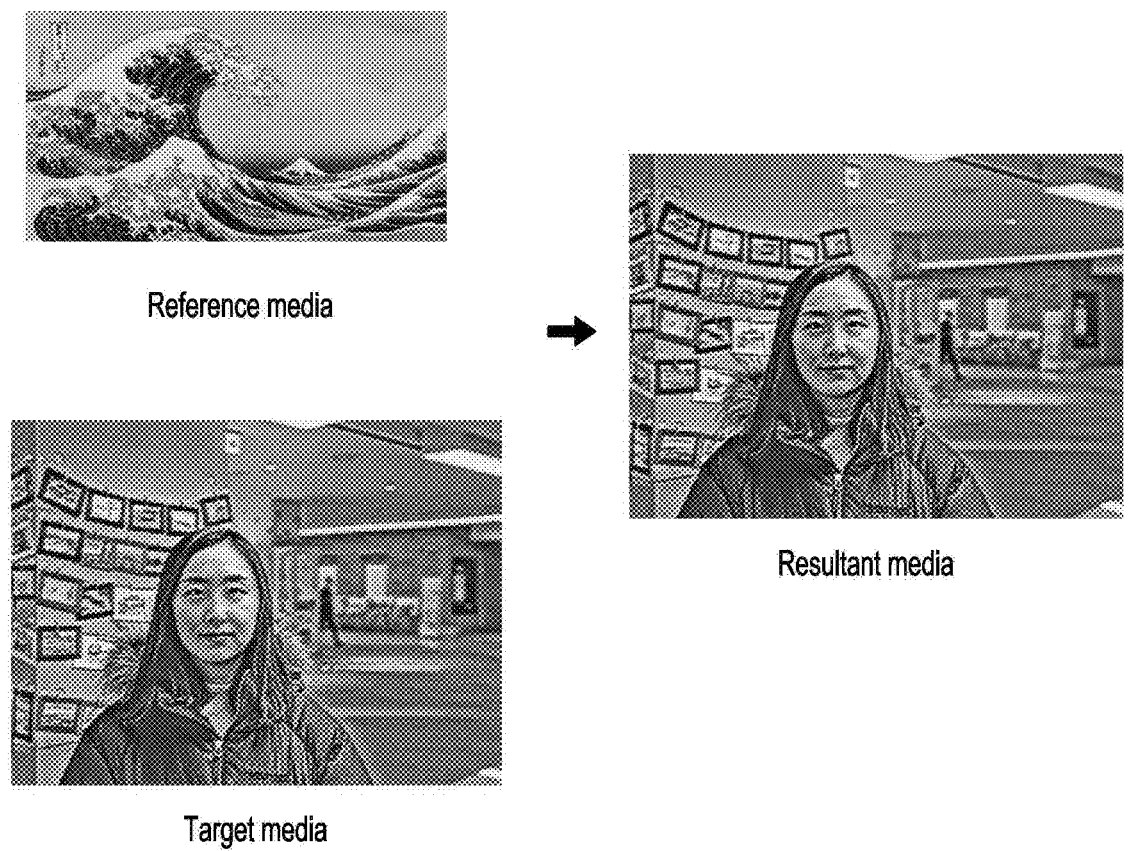
FIG. 12B is a diagram illustrating a compatibility check process performed on a target media, according to an embodiment.

FIGS. 12A and 12B are diagrams illustrating compatibility check process performed on the target media, according to an embodiment. The processing engine 110 may perform the compatibility check on the target media to determine the compatibility of the target media with the dominant edit attribute(s) of the reference media. As illustrated in FIG. 12A, the processing engine 110 identifies an effect attribute (i.e., add bunny ears and whiskers to faces) and a template attribute as the dominant edit attributes from the reference media. Further, the processing engine 110 performs the compatibility check on the target media to determine a compatibility with the effect attribute and the template attribute. Based on the compatibility check, the processing engine 110 determines that the target media can be compatible with the effect attribute and the target media cannot be compatible with the template attribute. Thus, the processing engine 110 selects the effect attribute as the compatible edit attribute which can be applied to the target media.

As illustrated in FIG. 12B, the processing engine 110 identifies a texture attribute as the dominant edit attribute of the reference media. The processing engine 110 checks the target media for compatibility with the texture attribute. The target media may not be compatible with the texture attribute, since the target media already has the texture attribute. The processing engine 110 does not select the compatible edit attribute for applying on the target media. Thus, the target media may be displayed without applying any edit attributes.

Figure 13A:
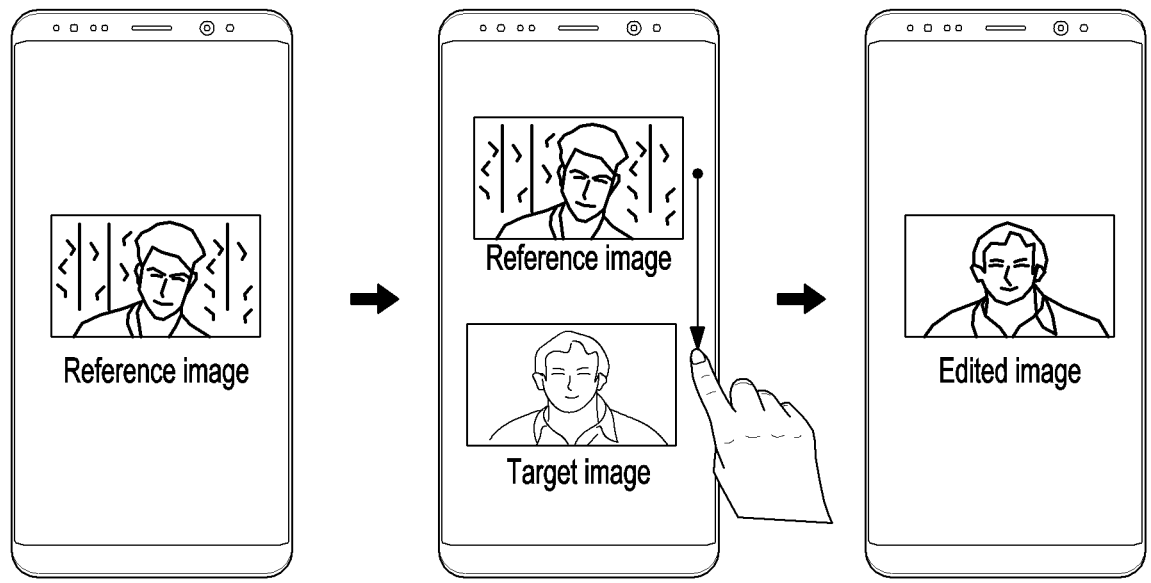
FIG. 13A is a diagram illustrating transferring of compatible edit attributes from a reference media to a target media, according to an embodiment.
Figure 13B:
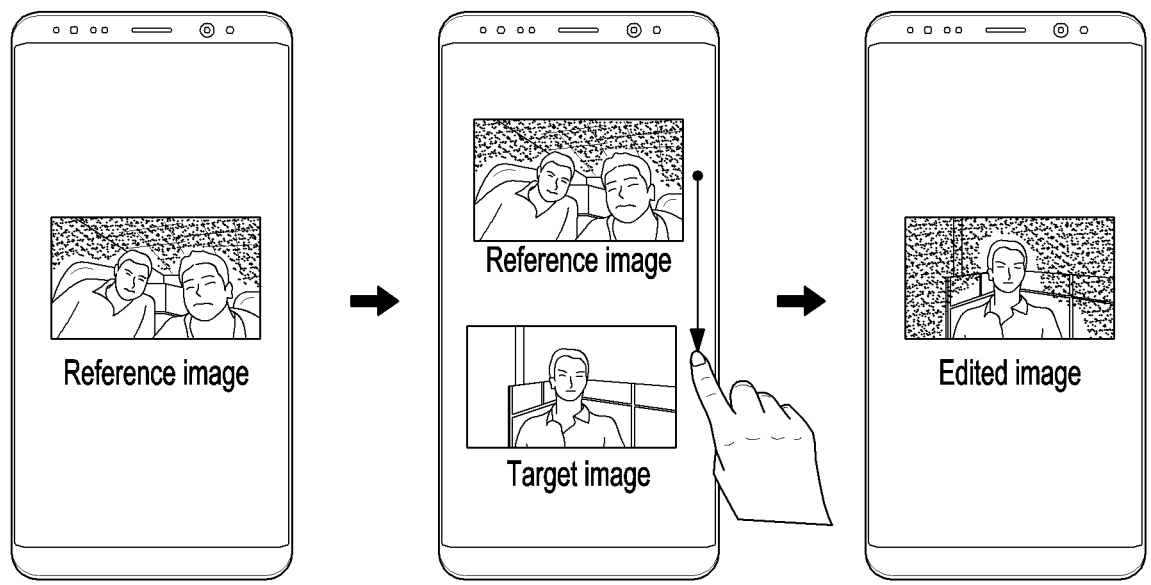
FIG. 13B is a diagram illustrating transferring of compatible edit attributes from a reference media to a target media, according to an embodiment.
Figure 13C:
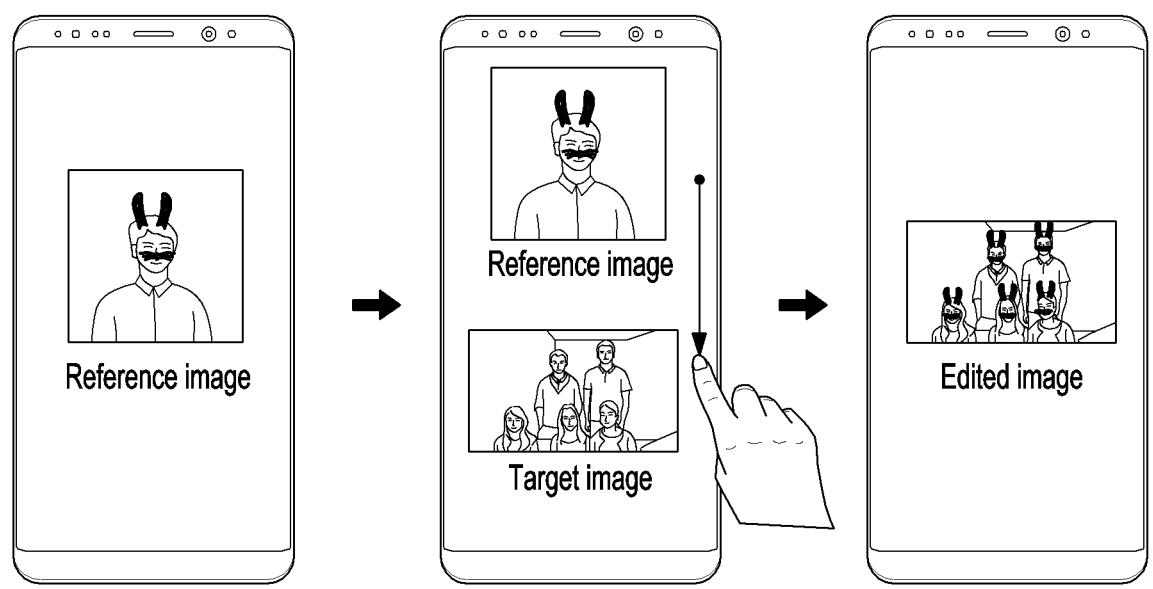
FIG. 13C is a diagram illustrating transferring of compatible edit attributes from a reference media to a target media, according to an embodiment.

FIGS. 13A, 13B and 13C are diagrams illustrating transferring of compatible edit attributes from the reference media to the target media, according to various embodiments.

FIG. 13A is a diagram illustrating transferring of the texture attribute from a reference image to a target image. The processing engine 110 identifies the artistic texture (i.e., the texture attribute) of the reference image as the compatible edit attribute. The edit transfer engine 112 edits the target image by applying the artistic texture of the reference image on the target image.

FIG. 13B is a diagram illustrating transferring of the effect attribute from the reference image to the target image. The processing engine 110 identifies the effect attribute (color effect) of the reference image as the compatible edit attribute. The edit transfer engine 112 edits the target image by applying the effect attribute (i.e., color effect) of the reference image to the target image.

FIG. 13C is a diagram illustrating transferring of the template attribute from the reference image to the target image. The processing engine 110 identifies the template attribute (i.e., stickers) of the reference image as the compatible edit attribute. The edit transfer engine 112 edits the target image by applying the template attribute (i.e., stickers) of the reference image to the target image.

Figure 14:
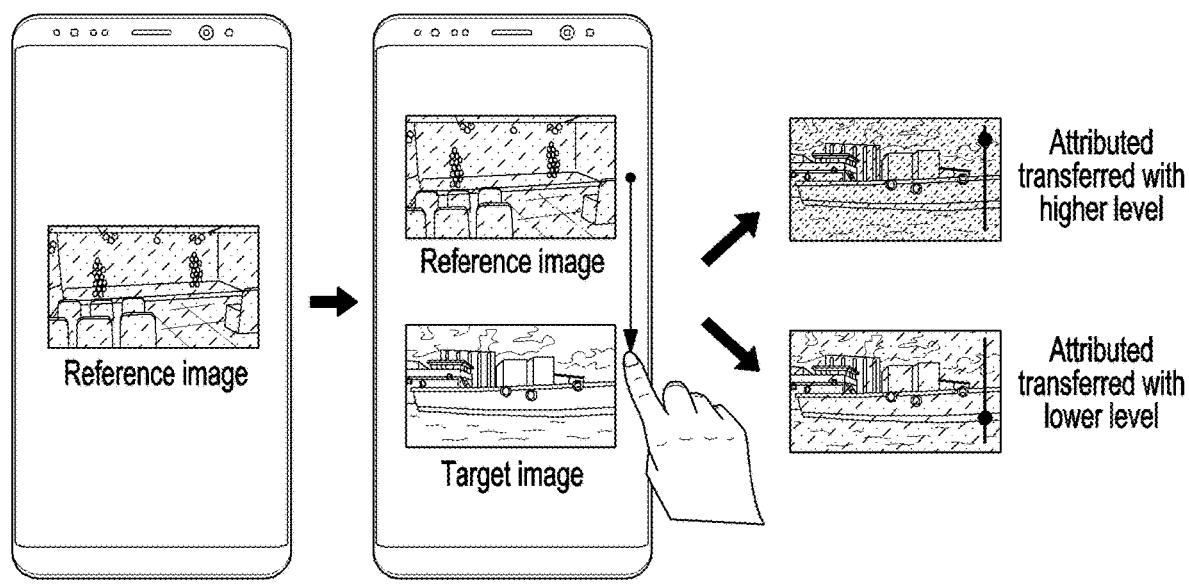
FIG. 14 is a diagram illustrating controlling a level of a compatible edit attribute(s) transferred from a reference media to a target media, according to an embodiment.

FIG. 14 is a diagram illustrating controlling of a level of the compatible edit attribute(s) transferred from the reference media to the target media, according to an embodiment. The edit transfer engine 112 may copy the compatible edit attribute from the reference image to the target image. Once the compatible edit attribute has been copied to the target image, the display unit 114 may display a slider on the display screen of the electronic device. The user can use the slider to vary the level of the compatible edit attribute applied on the target image.

Figure 15A:
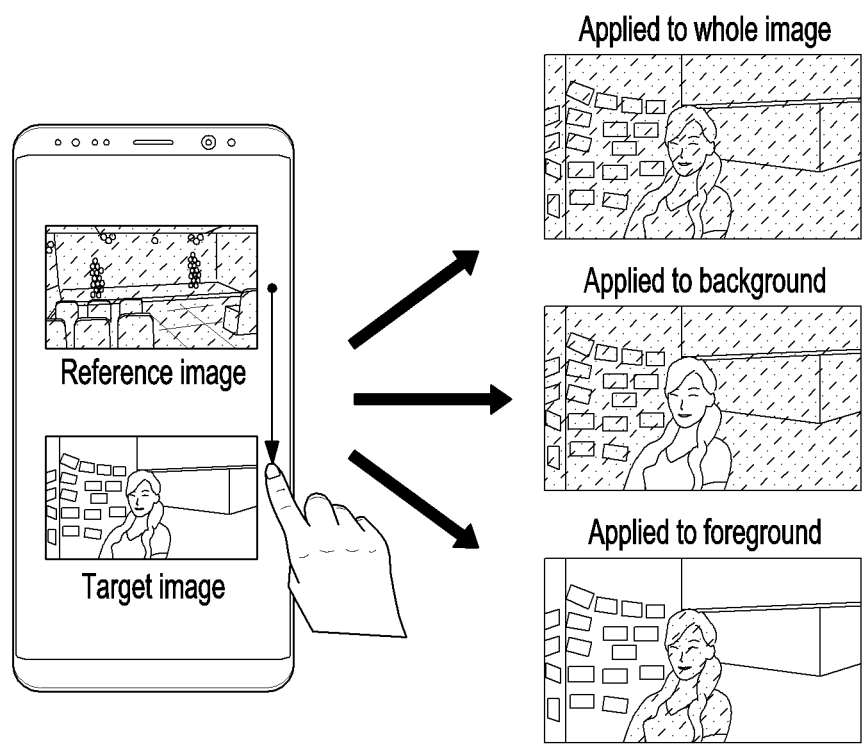
FIG. 15A is a diagram illustrating transferring of at least one compatible edit attribute(s) from a reference media only to particular portions of a target media, according to an embodiment.
Figure 15B:
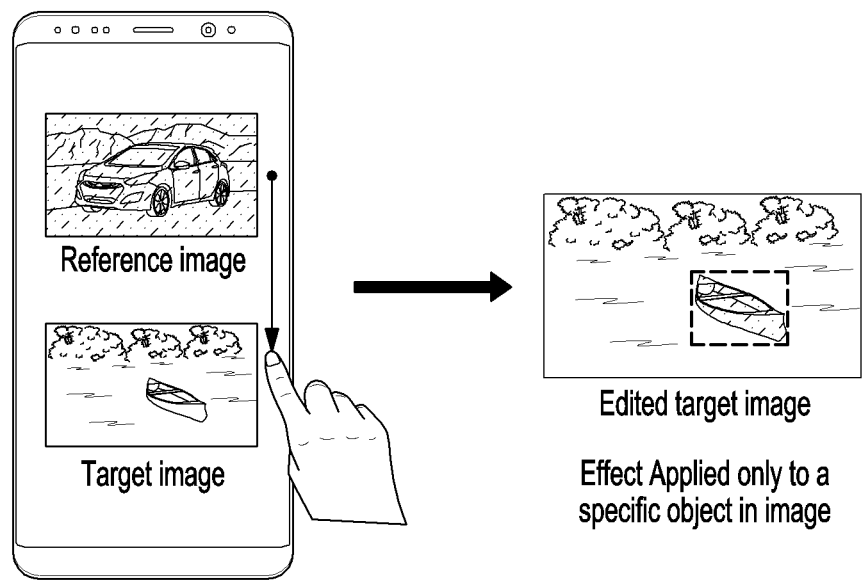
FIG. 15B is a diagram illustrating transferring of at least one compatible edit attribute(s) from a reference media only to particular portions of a target media, according to an embodiment.

FIGS. 15A and 15B are diagrams illustrating transferring of the compatible edit attribute(s) from the reference media only to particular portions of the target media, according to various embodiments. The edit transfer engine 112 may apply the compatible edit attribute to a specific region of interest (ROI)/portion in the target image or on complete image.

The edit transfer engine 112 can receive inputs (touching, marking, or scrabble) from the user specifying the specific ROI in the target image (alternatively, the entire target image may be designated as the ROI) for performing the edit operations. According to the inputs received from the user, the edit transfer engine 112 may apply the compatible edit attribute to at least one of the specific ROI(s) in the target image, such as the foreground of the target image and the background of the image as illustrated in FIG. 15A.

Further, the edit transfer engine 112 can apply the compatible edit attribute of the reference image on the specific compatible ROI in the target image, as illustrated in FIG. 15B.

Figure 16:
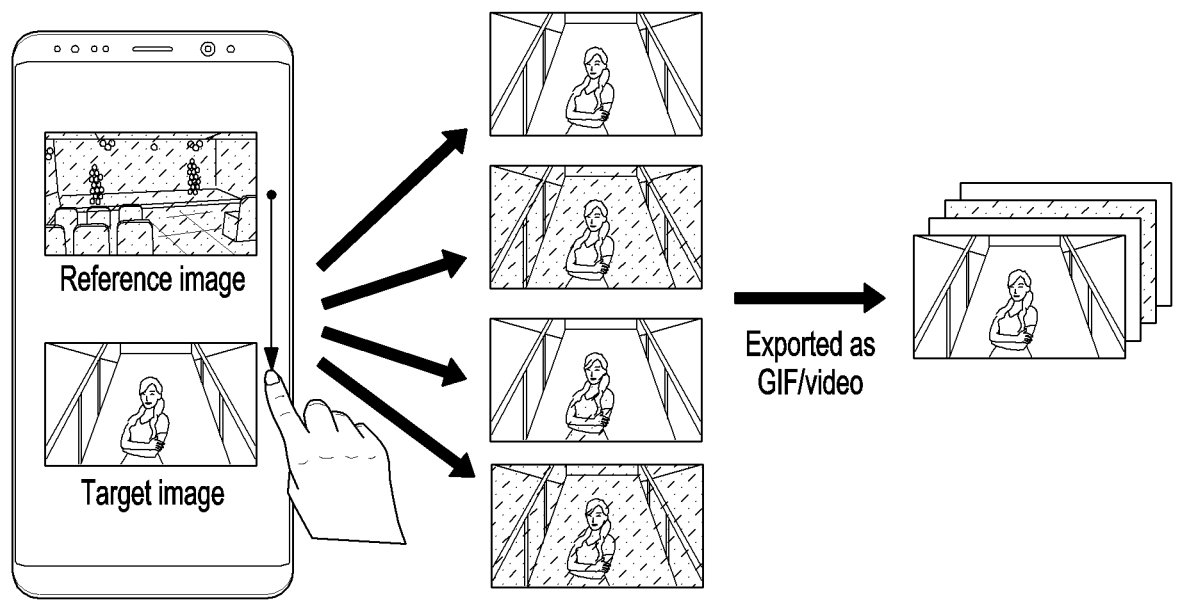
FIG. 16 is a diagram illustrating storing of resultant intermediate frames while transferring a compatible edit attribute(s) from a reference media to a target media, according to an embodiment.

FIG. 16 is a diagram illustrating storing of resultant intermediate frames while transferring the compatible edit attribute(s) from the reference media to the target media, according to an embodiment.

If one or more edit attributes are identified (for example, texture or color), the processing engine 110 can enable the user to choose to save and/or render every intermediate frame as a graphics interchange format (GIF) file or a video file, wherein each frame may capture each edit result. The final frame may have combined effects as illustrated in FIG. 16. The user may discard or save the edited target media.

Figure 17:
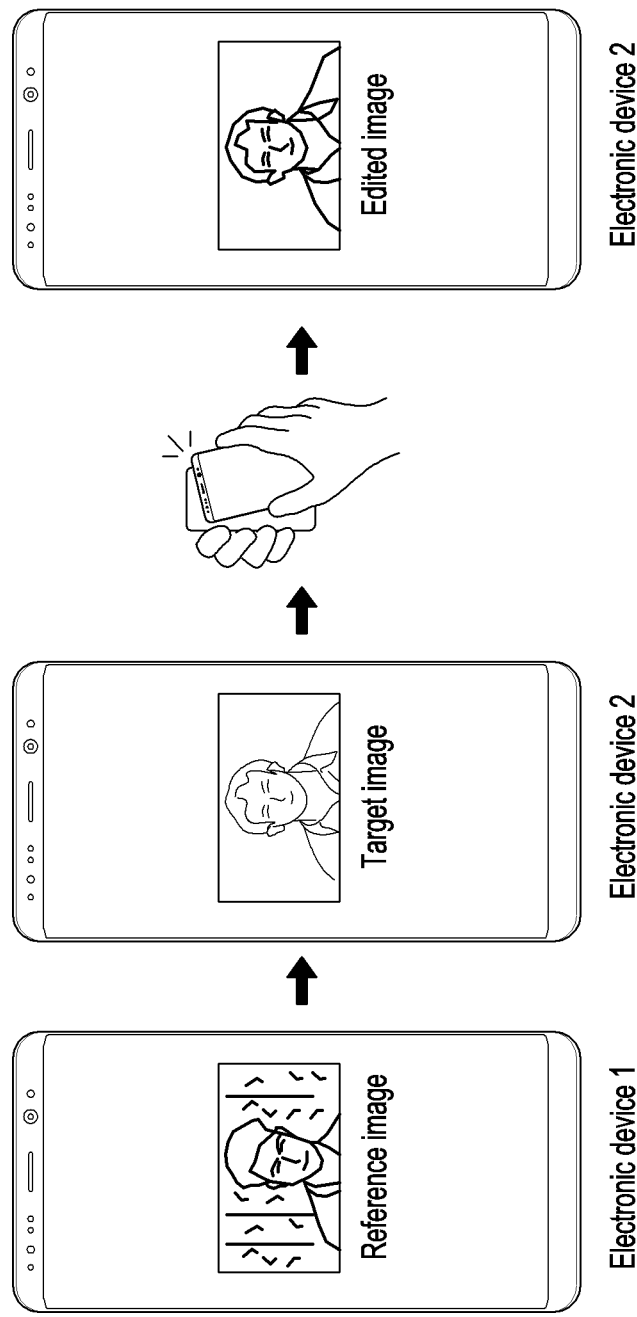
FIG. 17 is a diagram illustrating transferring of compatible edit attributes from a reference media present on a first electronic device to a target media present on a second device, according to an embodiment.

FIG. 17 is a diagram illustrating transferring of the compatible edit attributes from the reference media present on a first electronic device to the target media present on a second device, according to an embodiment. For example, the reference media is present on the first electronic device and the target media is present on the second electronic device. The edit transfer engine 112 of the first electronic device uses a communication mechanism like NFC to transfer the editing operations (e.g., compatible edit attributes) to the target media present on the second electronic device.

Figure 18:
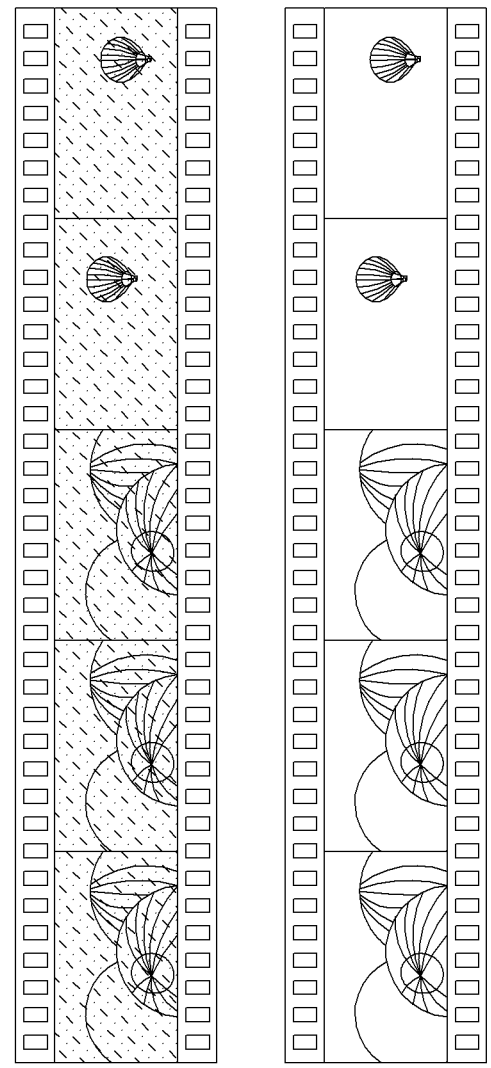
FIG. 18 is a diagram illustrating transferring of compatible edit attributes from a reference image to a target video, according to an embodiment.
Figure 18:
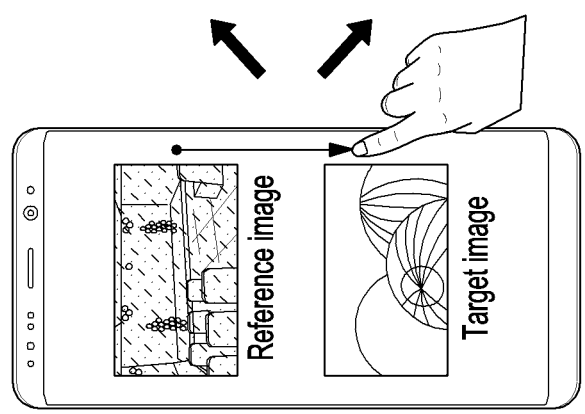

FIG. 18 is a diagram illustrating transferring of the compatible edit attributes from the reference image to a target video, according to an embodiment. The compatible edit attributes may be transferred from the reference image to the target video. The processing engine 110 can convert a video sequence to match the compatible edit attribute/style of the reference image. The processing engine 110 can receive user input indicating the edit attribute of the reference image which is required to be transferred to the target video.

Figure 19:
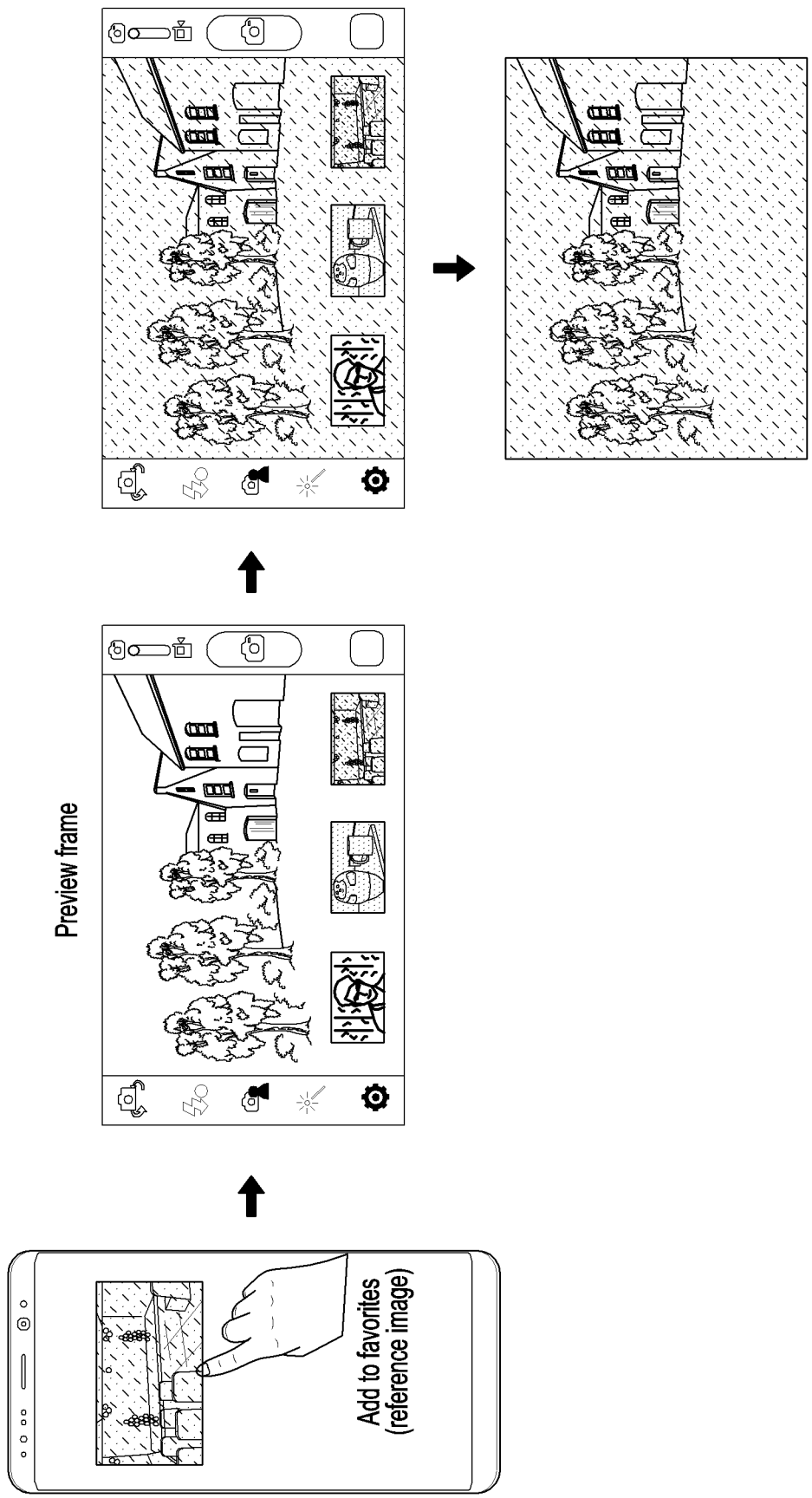
FIG. 19 is a diagram illustrating transferring of compatible edit attributes from a reference image to camera preview frames, according to an embodiment.

FIG. 19 is a diagram illustrating transferring of the compatible edit attributes from the reference image to camera preview frames, according to an embodiment. As illustrated in FIG. 19, the user can choose a picture having a particular style (e.g., media) from a favorite database provided by the storage unit 116, where the user has already added some images as favorite images. Further, the user can select a style (e.g., the compatible edit attribute) to apply to preview frames in a camera. The edit transfer engine 112 may transfer the style selected by the user to the preview frames. After transferring the style to the preview frames, the preview/target image can be captured by the camera. The target image may include the user selected style.

Figure 20:
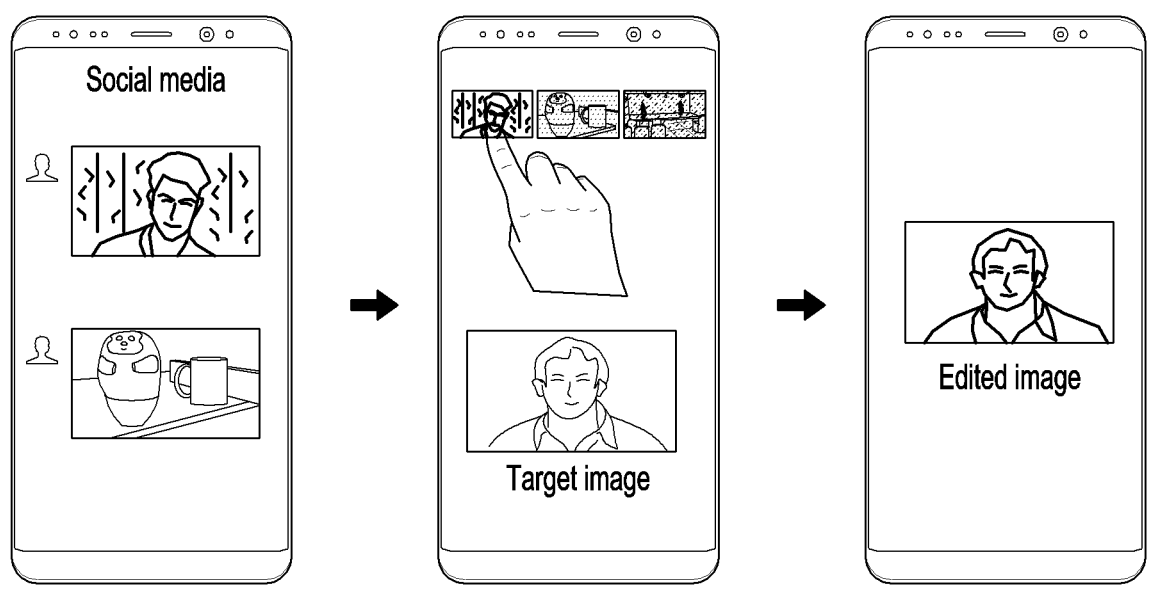
FIG. 20 is a diagram illustrating selection of a reference media from social media, according to an embodiment.

FIG. 20 is a diagram illustrating selection of the reference media from the social media, according to an embodiment. The user may download multiple images from the external source(s) 106, such as various social media platforms. The multiple images can be stored in the storage unit 116. Further, the user may select the reference image and the target image from the multiple images for applying the edit attributes of the reference image on the target image. The processing engine 110 can determine the texture attribute of the reference image as the compatible edit attribute. After selecting the compatible edit attribute, the edit transfer engine 112 may transfer the texture attribute (e.g., the compatible edit attribute) from the reference image to the target image.

Figure 21:
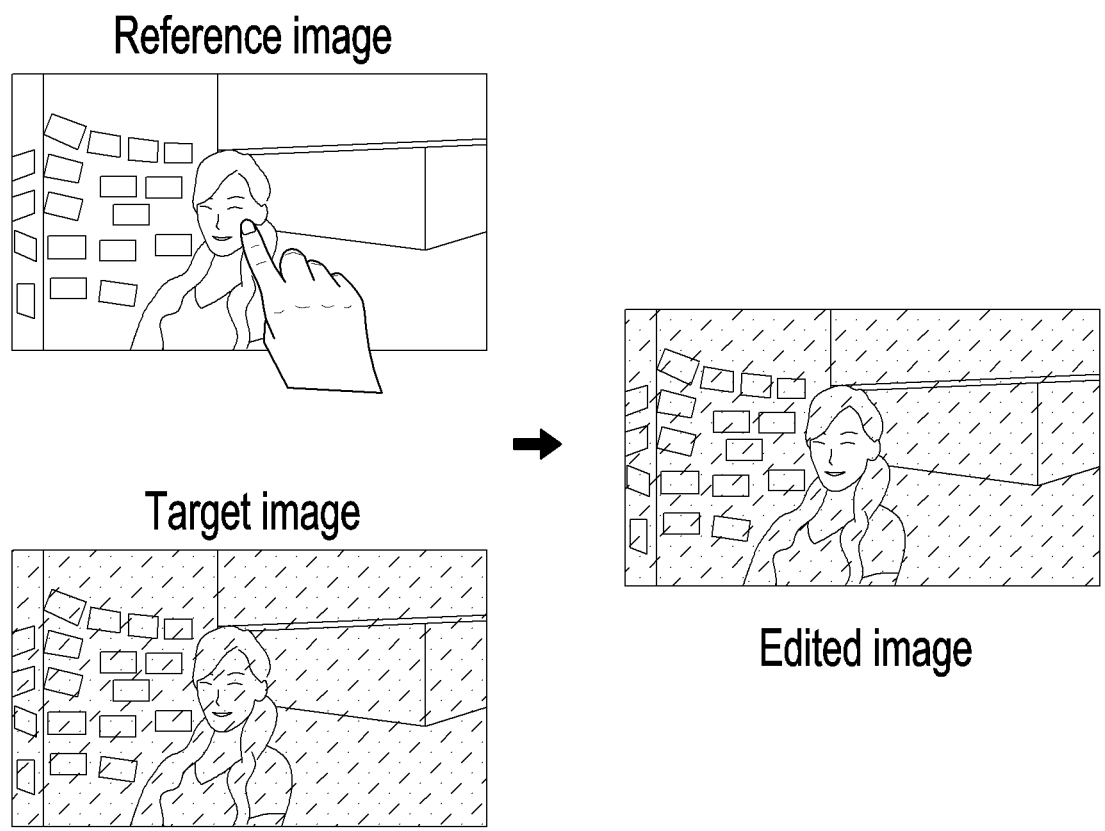
FIG. 21 is a diagram illustrating transferring of a face beautification attribute from a reference media to a target media, according to an embodiment.

FIG. 21 is a diagram illustrating transferring of a face beautification attribute from the reference media to the target media, according to an embodiment. The edit transfer engine 112 may transfer selfies attributes from the reference image to the target image. For example, the user can select beautification applied on a face present in the reference image as the compatible edit attribute. According to the user selection, the edit transfer engine 112 may apply the beautification on a face(s) present in the target image as illustrated in FIG. 21.

Figure 22:
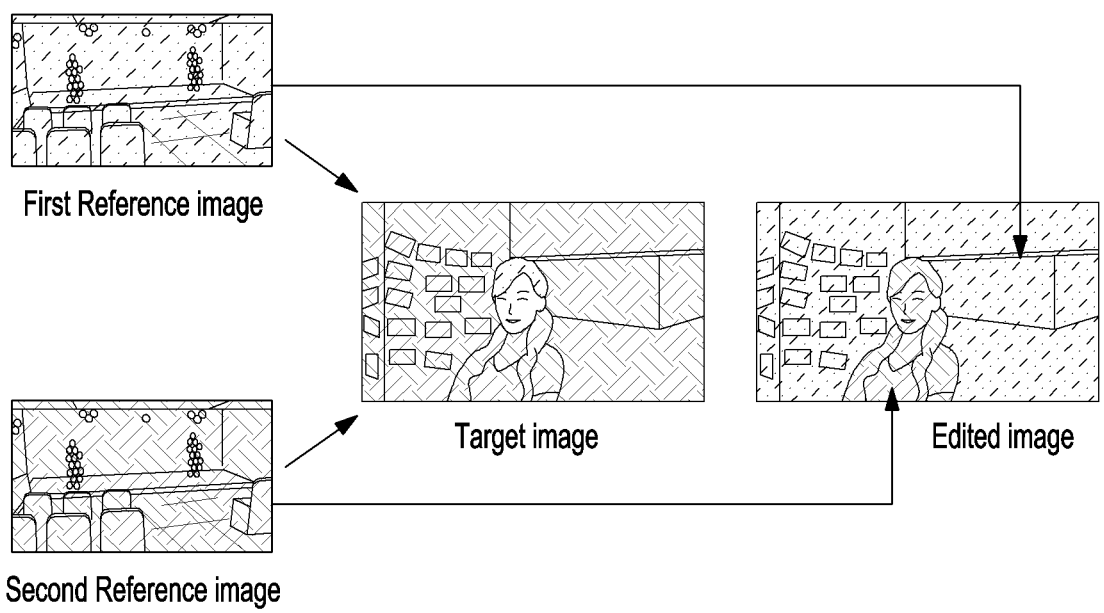
FIG. 22 is a diagram illustrating transferring of compatible edit attributes from multiple reference media to a target media, according to an embodiment.

FIG. 22 is a diagram illustrating transferring of the compatible edit attributes from multiple reference media to the target media, according to an embodiment. The electronic device can apply different edit attributes to different portions of the target image. For example, the user can select a first reference image and a second reference image. Further, the user can select an edit attribute/style (i.e., the texture attribute) from the first reference media as a first edit attribute. The user may want to apply the first edit attribute to the background of the target image. In addition, the user can select an edit attribute (i.e., the effect attribute) from the second reference image as a second edit attribute. The user may select the second edit attribute to be applied to foreground of the target image.

According to the user selection, the edit transfer engine 112 can apply the first edit attribute (i.e., the texture attribute) to the background of the target image and the second edit attribute (i.e., the effect attribute) to the foreground of the target image, as illustrated in FIG. 22. Thus, different edit attributes/styles can be applied to the foreground and background of the target image.

Figure 23:
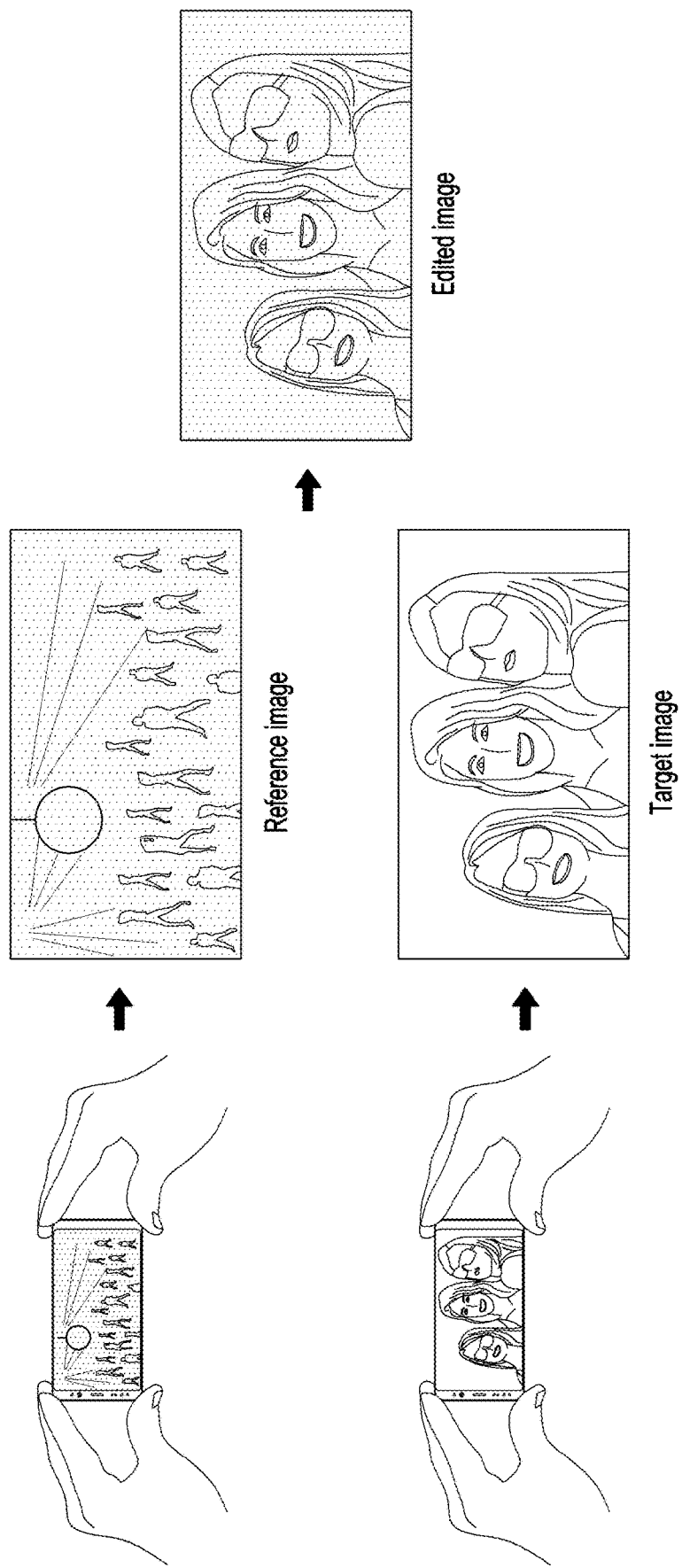
FIG. 23 is a diagram illustrating receiving user selected inputs for transferring compatible edit attributes from a reference media to a target media, according to an embodiment.

FIG. 23 is a diagram illustrating receiving user selected inputs for transferring compatible edit attributes from the reference media to the target media, according to an embodiment. As illustrated in FIG. 23, the user can capture an image and select the captured image as the reference image. Further, the user can select one or more colors of the reference image (i.e., the effect attribute) as the edit attribute which may be applied to a subsequent image upon capturing the subsequent image. The edit transfer engine 112 may transform the color of the reference image (i.e., the previous image) to the image while capturing. Thus, the captured image may comprise the color effects from the previously captured image.

Different camera option(s)/mode(s) of existing camera features may be combined into user favorite mode(s)/option(s).

Simple steps to combine different media options may be provided, such as beauty faces, effects, stickers, and collages, into a one-step capture option using a reference media.

The steps and editing time may be reduced to a single step to transfer the editing operations from the reference media to the target media.

Deep learning algorithms may be utilized to select the edit attributes of the reference media and to apply the selected edit attributes to the target media.

Several applications may not be required to be installed to apply edits.

The embodiments of the present disclosure can be implemented through at least a software program running on at least one hardware device and performing network management functions to control elements. The elements shown in FIG. 1 and FIG. 2 can be at least one of a hardware device, or a combination of a hardware device and a software module.

The present disclosure describes methods and systems for performing editing operations on media. Therefore, it is understood that the scope of protection is extended to such a program, and in addition to a computer readable means having a message therein, such computer readable storage means may contain a program code means for implementation of one or more steps of the method when the program runs on a server or mobile device or any suitable programmable device.

The method may be implemented through, or together with, a software program written in very high speed integrated circuit hardware description language (VHDL) or another programming language. The software program may be implemented by one or more devices executing VHDL or several software modules being executed on at least one hardware device. The device can be any kind of portable device that can be programmed. The device may also include a hardware means, such as an application specific integrated circuit (ASIC), or a combination of hardware and software, such as an ASIC and a field programmable gate array (FPGA), or at least one microprocessor and at least one memory with software modules located therein. The method described herein could be implemented partly in hardware and partly in software. Alternatively, the method may be implemented on different hardware devices using a plurality of central processing units (CPUs).

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method for performing editing operations on media by an electronic device, the method comprising:
   receiving, by a processor of the electronic device, at least one reference media and at least one target media;
   identifying, by the processor, a template mask in the at least one reference media;
   identifying, by the processor, a template corresponding to the template mask from among templates of a template database stored in a memory of the electronic device; and
   applying, by the processor, the identified template on the at least one target media.

2. The method of claim 1, wherein identifying the template mask includes:
   calculating a probability of at least one edit attribute of the at least one reference media; and
   identifying the template mask of the at least one reference media by analyzing the probability of the at least one edit attribute of the at least one reference media.

3. The method of claim 2, wherein the template mask is identified using a convolutional neural network (CNN).

4. The method of claim 1, further comprising receiving at least one input from at least one user to select at least one portion of the at least one target media for processing.

5. The method of claim 1, wherein the template mask is compared with the templates of the template database based on pattern matching.

6. An electronic device for performing editing operations on media, the electronic device comprising:
   a memory; and
   a processor configured to:
   receive at least one reference media and at least one target media;
   identify a template mask in the at least one reference media;
   identify a template corresponding to the template mask from among templates of a template database stored in the memory based on pattern matching; and
   apply the identified template on the at least one target media.

7. The electronic device of claim 6, wherein the processor is further configured to:
   calculate a probability of at least one edit attribute of the at least one reference media; and
   identify the template mask of the at least one reference media by analyzing the probability of the at least one edit attribute of the at least one reference media.

8. The electronic device of claim 7, wherein the template mask is identified using a convolutional neural network (CNN).

9. The electronic device of claim 6, wherein the processor is further configured to receive at least one input from at least one user to select at least one portion of the at least one target media for processing.

10. The electronic device of claim 6, wherein the processor is configured to compare the template mask with the templates of the template database based on pattern matching.

* * * * *